US 11,885,926 B2

(12) United States Patent
Park et al.

(10) Patent No.: US 11,885,926 B2
(45) Date of Patent: Jan. 30, 2024

(54) ELECTRONIC DEVICE AND METHOD FOR DETECTING WHETHER A COVER IS ATTACHED THERETO

(71) Applicant: Samsung Electronics Co., Ltd., Suwon-si (KR)

(72) Inventors: Jeonggyun Park, Suwon-si (KR); Sangpil Lee, Suwon-si (KR); Sejeong Oh, Suwon-si (KR); Taekeun Kim, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/813,258

(22) Filed: Jul. 18, 2022

(65) Prior Publication Data

US 2023/0028795 A1  Jan. 26, 2023

Related U.S. Application Data

(63) Continuation of application No. PCT/KR2022/010470, filed on Jul. 18, 2022.

(30) Foreign Application Priority Data

Jul. 16, 2021  (KR) .................. 10-2021-0093560

(51) Int. Cl.
*G01V 3/38* (2006.01)
*G06F 1/16* (2006.01)
(Continued)

(52) U.S. Cl.
CPC .............. *G01V 3/38* (2013.01); *G06F 1/1626* (2013.01); *G06F 1/1677* (2013.01); *H04M 1/0245* (2013.01); *G01V 3/08* (2013.01)

(58) Field of Classification Search
CPC .......... G01V 3/38; G01V 3/08; G06F 1/1626; G06F 1/1677; H04M 1/0245
See application file for complete search history.

(56) References Cited

U.S. PATENT DOCUMENTS

2005/0283988 A1   12/2005  Sato et al.
2007/0133156 A1*   6/2007  Ligtenberg ............ G06F 1/1616
                                                                 361/679.3
(Continued)

FOREIGN PATENT DOCUMENTS

JP   2003-166826 A   6/2003
JP   2006-030171 A   2/2006
(Continued)

OTHER PUBLICATIONS

International Search Report and Written Opinion of the International Searching Authority dated Oct. 11, 2022, in connection with International Application No. PCT/KR2022/010470, 9 pages.

*Primary Examiner* — Lewis G West

(57) ABSTRACT

An electronic device includes: a housing including a first surface facing a first direction; and a second surface facing a second direction opposite to the first direction, wherein an inner space is formed between the first surface and the second surface; a board disposed in the inner space; a geomagnetic sensor disposed on the board; and a processor. The geomagnetic sensor is configured to detect a first magnetic force, when a first cover part of the cover, including a first magnetic member, is disposed to cover the first surface from the first direction of the electronic device, and detect a second magnetic force, when a second cover part of the cover, including a second magnetic member, is disposed to cover the second surface from the second direction of the electronic device in a state where the first cover part is disposed to cover the first surface from the first direction of the electronic device.

16 Claims, 14 Drawing Sheets

(51) Int. Cl.
*H04M 1/02* (2006.01)
*G01V 3/08* (2006.01)

(56) References Cited

U.S. PATENT DOCUMENTS

| | | | |
|---|---|---|---|
| 2009/0170574 A1* | 7/2009 | Harmon | H04M 1/0237 |
| | | | 455/575.4 |
| 2013/0100055 A1* | 4/2013 | Lauder | G06F 3/041 |
| | | | 345/173 |
| 2014/0159839 A1* | 6/2014 | Kim | H01H 36/00 |
| | | | 335/219 |
| 2014/0210803 A1 | 7/2014 | Oh et al. | |
| 2016/0197637 A1* | 7/2016 | Lee | G06F 3/14 |
| | | | 455/566 |
| 2016/0205237 A1 | 7/2016 | Baek et al. | |
| 2016/0259378 A1 | 9/2016 | Oliver et al. | |
| 2018/0007632 A1 | 1/2018 | Chen et al. | |
| 2018/0364761 A1* | 12/2018 | Lin | G06F 1/1652 |
| 2019/0066412 A1* | 2/2019 | Nam | H04L 63/107 |
| 2019/0107876 A1 | 4/2019 | Yamazaki et al. | |
| 2020/0037435 A1 | 1/2020 | Park et al. | |
| 2020/0320962 A1* | 10/2020 | Kim | G06F 1/1641 |
| 2021/0034102 A1* | 2/2021 | Cho | H01F 7/0226 |
| 2022/0065660 A1* | 3/2022 | Kim | G01D 5/142 |
| 2022/0308247 A1* | 9/2022 | Li | G01V 3/081 |
| 2022/0390639 A1* | 12/2022 | Laurösch | E05B 65/02 |
| 2023/0068763 A1* | 3/2023 | Kwon | H04M 1/0243 |

FOREIGN PATENT DOCUMENTS

| | | |
|---|---|---|
| JP | 2013-236348 A | 11/2013 |
| KR | 10-2013-0018393 A | 2/2013 |
| KR | 10-2014-0139783 A | 12/2014 |
| KR | 10-2015-0020997 A | 2/2015 |
| KR | 10-2015-0055423 A | 5/2015 |
| KR | 10-2015-0083415 A | 7/2015 |
| KR | 10-2016-0109248 A | 9/2016 |
| KR | 10-2016-0127026 A | 11/2016 |
| KR | 10-2018-0106510 A | 10/2018 |

* cited by examiner

ELECTRONIC DEVICE AND METHOD FOR DETECTING WHETHER A COVER IS ATTACHED THERETO

CROSS-REFERENCE TO RELATED APPLICATIONS

This application is a continuation of International Application No. PCT/KR2022/010470 designating the United States, filed on Jun. 18, 2022, in the Korean Intellectual Property Receiving Office and claiming priority to Korean Patent Application No. 10-2021-0093560, filed on Jul. 16, 2021, in the Korean Intellectual Property Office, the disclosures of all of which are incorporated by reference herein in their entireties.

BACKGROUND

1. Field

Various embodiments of the disclosure relate to an electronic device, and more particularly, to an electronic device including a geomagnetic sensor, which is capable of determining whether a cover is coupled with (attached to or detached from) the electronic device, along with determining magnetic north.

2. Description of Related Art

As information and communication technologies and semiconductor technologies have developed, the various types of electronic devices have been widespread and used at a rapid pace. Particularly, recent electronic devices are being developed such that communication may be conducted while the electronic devices are carried. In addition, the electronic devices may output stored information as sound or an image. As the integration level of the electronic devices increases and high-speed and large-capacity wireless communication becomes common, a single electronic device such as a mobile communication terminal may be equipped with various functions in recent years. For example, entertainment functions such as games, multimedia functions such as music/video playback, communication and security functions for mobile banking, schedule management, and electronic wallet functions as well as communication functions are integrated into a single electronic device. Such electronic devices are being miniaturized so that users may conveniently carry them.

Since the exterior of an electronic device and electronic components included in the electronic device are vulnerable to external physical and chemical impacts, a cover (e.g., an accessory case) for protecting them is widely used.

SUMMARY

According to some embodiments, to detect whether a cover is attached to an electronic device, the cover may include a magnetic member, and a sensor (e.g., a hall integrated circuit (IC) sensor) for detecting whether the magnetic member is in proximity may be attached to the electronic device. When the cover is attached to the electronic device, a hall effect may be generated by the magnetic member of the cover, and the hall IC sensor of the electronic device may generate a signal corresponding to the hall effect. A processor included in the electronic device may receive the signal generated from the hall IC sensor to identify whether the cover has been attached. As such, it is conventionally determined whether the cover has been attached by using a magnetic force generated between the magnetic member and the hall IC sensor corresponding to the magnetic member. However, the performance of a plurality of electronic components disposed inside the electronic device may be directly affected by the magnetic force between the magnetic member and the hall IC sensor and significantly degraded in some cases. For example, the magnetic force between the magnetic member and the hall IC sensor may interfere with radio waves of an antenna attached inside the electronic device, thereby degrading the performance. Moreover, the hall IC sensor for detecting the magnetic force of the magnetic member of the cover may have a limited mounting space in a small electronic device such as a smart phone. That is, the magnetic member and the sensor for determining whether the cover has been attached may impose a constraint on the design of the electronic device.

According to various embodiments of the disclosure, a means for determining whether a cover is coupled with (attached to or detached from) an electronic device without a hall IC sensor in the electronic device, and a method of determining the same are provided.

According to various embodiments, an electronic device combinable with a cover for protecting the electronic device may include: a housing including a first surface facing a first direction; and a second surface facing a second direction opposite to the first direction, wherein an inner space is formed between the first surface and the second surface; a board disposed in the inner space; a geomagnetic sensor disposed on the board; and a processor. The geomagnetic sensor may be configured to detect a first magnetic force, when a first cover part of the cover, including a first magnetic member, is disposed to cover the first surface from the first direction of the electronic device, and detect a second magnetic force, when a second cover part of the cover, including a second magnetic member, is disposed to cover the second surface from the second direction of the electronic device in a state where the first cover part is disposed to cover the first surface from the first direction of the electronic device. The processor may be configured to determine whether the cover is coupled with the electronic device, along with determining magnetic north, based on information about a magnetic force detected by the geomagnetic sensor.

According to various embodiments, in a method of controlling an electronic device including a display, an antenna, a geomagnetic sensor, and a processor, and combinable with a cover, based on a magnetic force measured by the geomagnetic sensor, when a first magnetic force greater than a predetermined value is detected from a first direction, determining, by the processor, that a first cover part of the cover is coupled with the electronic device and performing a wireless authentication operation, and when a second magnetic force greater than a predetermined value is detected from a second direction after the cover is identified as genuine according to the wireless authentication operation, determining, by the processor, that a second cover part of the cover covers at least a part of the display of the electronic device and performing an operation of deactivating the at least part of the display.

According to various embodiments, an electronic device may include: a housing including a first surface facing a first direction; and a second surface facing a second direction opposite to the first direction, wherein an inner space is formed between the first surface and the second surface; a board disposed in the inner space; a geomagnetic sensor disposed on the board; and a cover configured to protect the electronic device, and including a first cover part for covering the first surface of the electronic device and a second cover part for covering the second surface of the electronic device; a first magnetic member disposed at a first position of the first cover part; and a second magnetic member disposed at a second position of the second cover part. The first position of the first magnetic member may be set to a position at which a first magnetic force acts on the geomagnetic sensor, when the first cover part is disposed to cover the first surface from the first direction of the electronic device, and the second position of the second magnetic material may be set to a position at which a second magnetic force acts on the geomagnetic sensor, when the second cover part is disposed to cover the second surface from the second direction of the electronic device in a state in which the first cover part is disposed to cover the first surface from the first direction of the electronic device.

According to various embodiments, an electronic device may include: a housing; a board disposed in an inner space of the housing; a geomagnetic sensor disposed on the board; and a processor. The geomagnetic sensor may be configured to detect a first magnetic force from a first direction or a second magnetic force from a second direction from each of a first magnetic member and a second magnetic member which are disposed inside the housing or in a cover covering at least a part of the housing, spaced apart from the geomagnetic sensor by a specified distance and have variable positions. The processor may be configured to be capable of determining whether the cover is coupled with the electronic device or various motions of the electronic device, along with determining magnetic north, based on information about the magnetic force detected by the geomagnetic sensor.

According to various embodiments of the disclosure, it may be determined whether a cover has been attached to an electronic device without a hall integrated circuit (IC) sensor. Therefore, performance degradation of various electronic components included in the electronic device may be prevented. Further, because the electronic device determines whether the cover has been attached by means of another sensor (e.g., a geomagnetic sensor) disposed in the electronic device, without including a separate sensor for measuring a magnetic force (e.g., a hall IC sensor), difficulty in mounting components inside the electronic device may be eliminated, manufacturing cost may be reduced, and the electronic device may be efficiently designed.

Further, according to various embodiments of the disclosure, magnetic north may be determined successfully at the geomagnetic sensor, while it is determined whether the cover has been attached to the electronic device.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
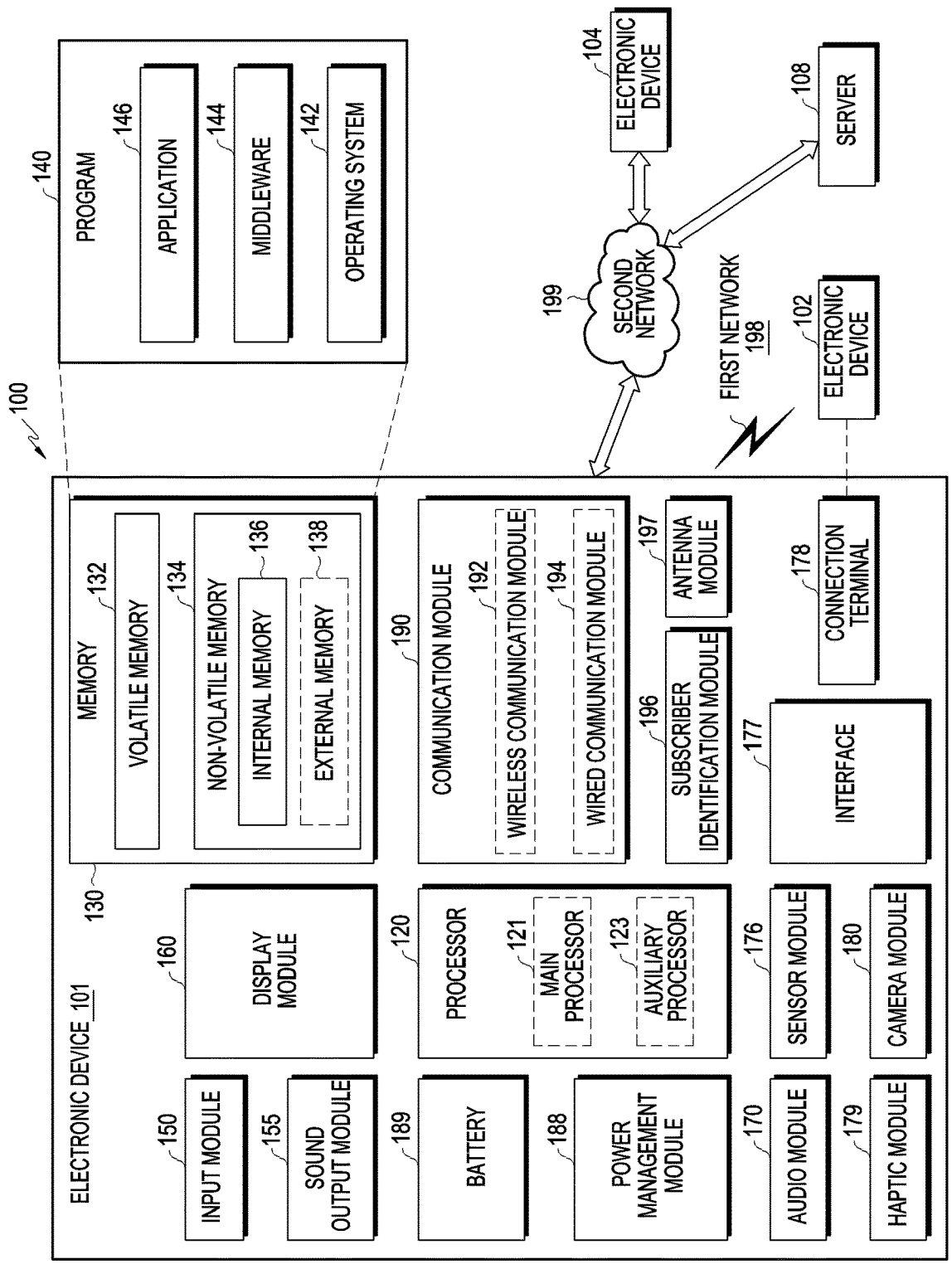
FIG. 1 illustrates a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
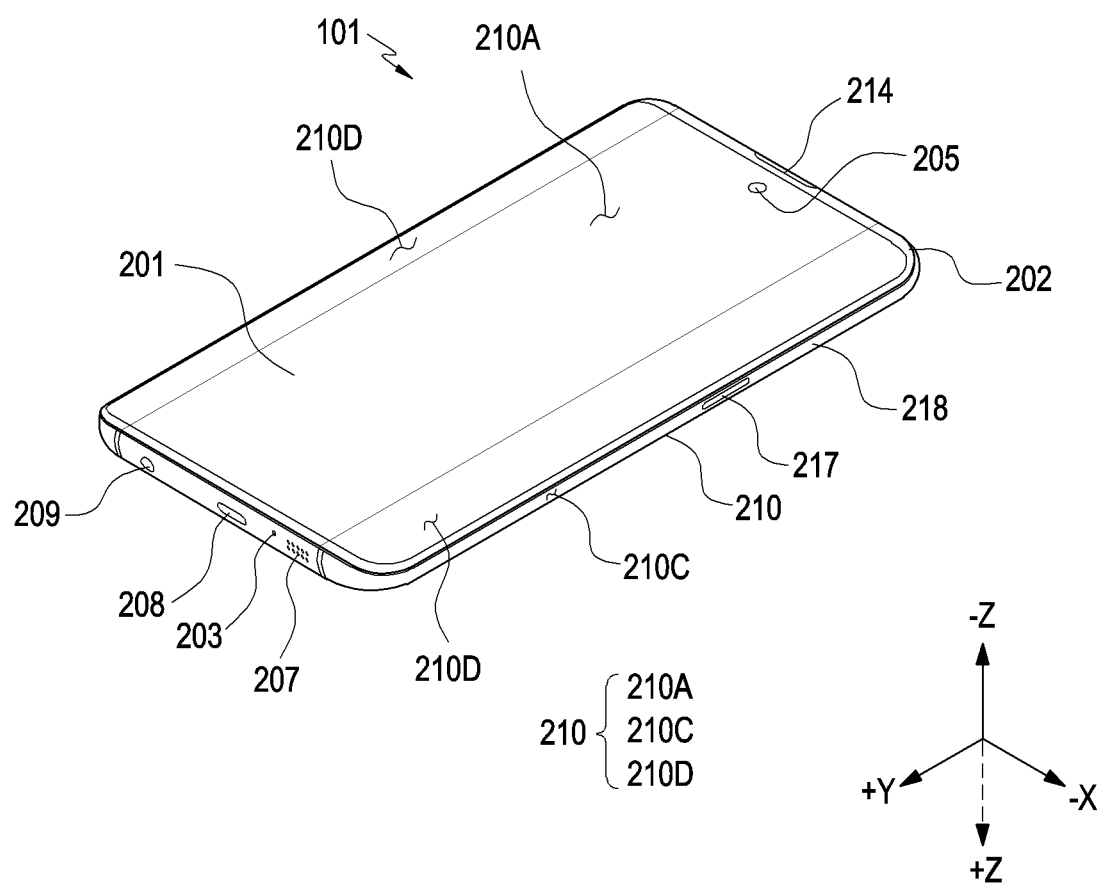
FIG. 2A illustrates a perspective view illustrating a front surface of an electronic device according to various embodiments.
Figure 2B:
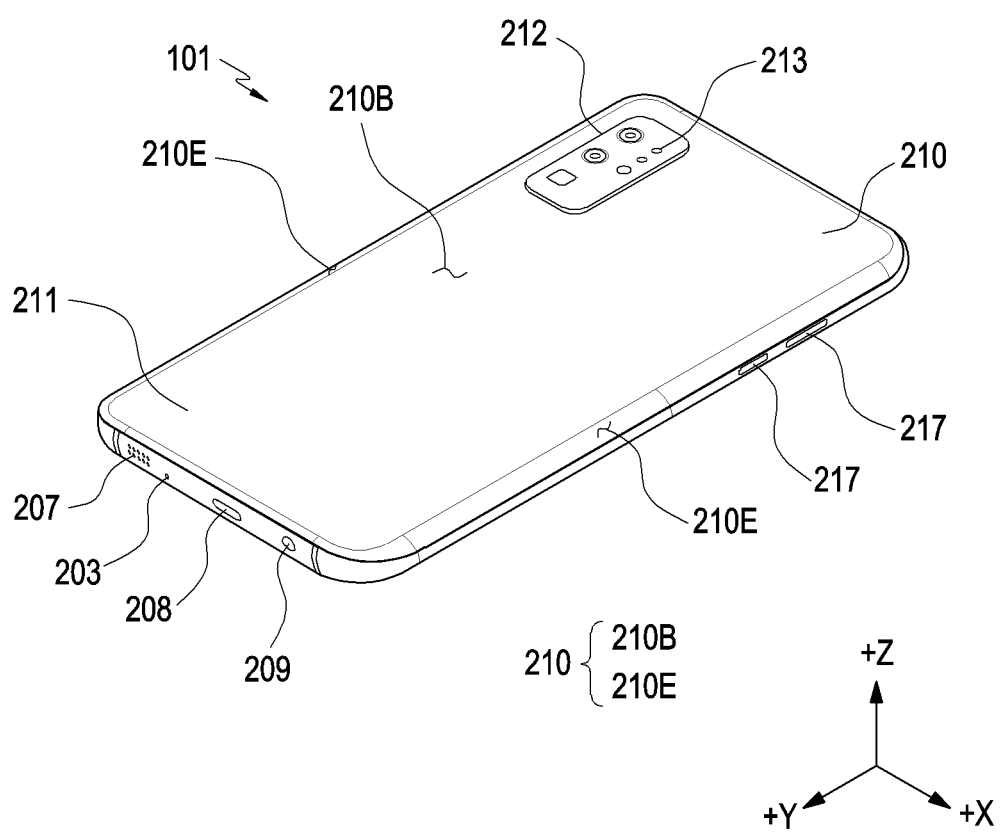
FIG. 2B illustrates a perspective view illustrating a rear surface of an electronic device according to various embodiments.

FIG. 2A illustrates a perspective view illustrating a front surface of an electronic device according to various embodiments of the disclosure. FIG. 2B illustrates a perspective view illustrating a rear surface of an electronic device according to various embodiments of the disclosure.

Referring to FIGS. 2A and 2B, the electronic device 101 according to an embodiment may include a housing 210 which includes a front surface 210A, a rear surface 210B, and a side surface 210C surrounding a space between the front surface 210A and the rear surface 210B. In other embodiments (not shown), the housing 210 may refer to a structure that forms a part of the front surface 210A of FIG. 2A, the rear surface 210B of FIG. 2B, and the side surface 210C. According to one embodiment, at least a part of the front surface 210A may be formed by a front plate 202 (e.g., a glass plate or polymer plate including various coating layers), which is at least partially or substantially transparent. The rear surface 210B may be formed by a rear plate 211. The rear plate 211 may be formed of, for example, glass, ceramic, polymer, metal (e.g., aluminum, stainless steel (STS), or magnesium), or a combination of at least two of these materials. The side surface 210C may be coupled with the front plate 202 and the rear plate 211 and formed by a side bezel structure (or "side member") 218 including metal or polymer. In some embodiments, the rear plate 211 and the side bezel structure 218 may be integrally formed and include the same material (e.g., glass, a metallic material such as aluminum, or ceramic).

In the illustrated embodiment, the front plate 202 may include two first edge areas 210D extending seamlessly from the front surface 210A toward the rear plate 211 at ends of both long edges thereof. In the illustrated embodiment (see FIG. 2B), the rear plate 211 may include two second edge areas 210E extending seamlessly from the rear surface 210B toward the front plate 202 at ends of both long edges thereof. In some embodiments, the front plate 202 (or the rear plate 211) may include only one of the first edge areas 210D (or only one of the second edge areas 210E). In other embodiments, some of the first edge areas 210D or the second edge areas 210E may not be included. In the above embodiments, when viewed from a side of the electronic device 101, the side bezel structure 218 may have a first thickness (or width) on the side surfaces, which do not include the first edge areas 210D or the second edge areas 210E, and a second thickness smaller than the first thickness on the side surfaces, which include the first edge areas 210D or the second edge areas 210E.

According to an embodiment, the electronic device 101 may include at least one of a display 201, audio modules 203, 207, and 214 (e.g., the audio module 170 of FIG. 1), a sensor module (e.g., the sensor module 176 of FIG. 1), camera modules 205, 212, and 213 (e.g., the camera module 180 of FIG. 1), key input devices 217 (e.g., the input module 150 of FIG. 1), or connector holes 208 and 209 (e.g., the connecting terminal 178 of FIG. 1). In some embodiments, the electronic device 101 may not be provided with at least one (e.g., the connector hole 209) of the components or additionally include other components.

According to an embodiment, the display 201 may be visually exposed, for example, through a substantial portion of the front plate 202. In some embodiments, at least a part of the display 201 may be exposed through the front plate 202 forming the front surface 210A and the first edge areas 210D. In some embodiments, the corners of the display 201 may be formed in the same shapes as those of adjacent peripheral portions of the front plate 202 on the whole. In other embodiments (not shown), the gap between the periphery of the display 201 and the periphery of the front plate 202 may be equal on the whole to increase the exposed area of the display 201.

According to an embodiment, a surface (or the front plate 202) of the housing 210 may include a view area formed by visual exposure of the display 201. For example, the view area may include the front surface 210A and the first edge areas 210D.

In another embodiment other embodiments (not shown), the electronic device 101 may include a recess or an opening formed in a part of the view area (e.g., the front surface 210A and the first edge areas 210D) of the display 201, and may include at least one of the audio module 214, a sensor module (not shown), a light emitting element (not shown), or the camera module 205, which is aligned with the recess or the opening. In other embodiments (not shown), the electronic device 101 may include at least one of the audio module 214, a sensor module (not shown), the camera module 205, a fingerprint sensor (not shown), or a light emitting element (not shown) on the rear surface of the view area of the display 201.

In other embodiments (not shown), the display 201 may be incorporated with or disposed adjacent to a touch sensing circuit, a pressure sensor that measures the intensity (pressure) of a touch, or a digitizer that detects a magnetic field-based stylus pen.

In some embodiments, at least some of the key input devices 217 may be disposed in the first edge areas 210D or the second edge areas 210E.

According to an embodiment, the audio modules 203, 207, and 214 may include a microphone hole 203 and speaker holes 207 and 214. A microphone for obtaining an external sound may be disposed in the microphone hole 203, and in some embodiments, a plurality of microphones may be disposed to detect the direction of a sound. The speaker holes 207 and 214 may include an external speaker hole 207 and a receiver hole 214 for calls. In some embodiments, the speaker holes 207 and 214 and the microphone hole 203 may be implemented as a single hole, or a speaker (e.g., a piezo speaker) may be included without the speaker holes 207 and 214. The audio modules 203, 207, and 214 may be designed in various manners such as installation of only some audio modules or addition of a new audio module according to the structure of the electronic device 101, not limited to the above structure.

According to an embodiment, a sensor module (not shown) may generate, for example, an electrical signal or data value corresponding to an internal operation state or external environmental state of the electronic device 101. The sensor module (not shown) may include, for example, a first sensor module (not shown) (e.g., a proximity sensor) and/or a second sensor module (not shown) (e.g., a fingerprint sensor), which is disposed on the front surface 210A of the housing 210, or a third sensor module (not shown) (e.g., a heart rate monitor (HRM) sensor) or a fourth sensor module (not shown) (e.g., a fingerprint sensor), which is disposed on the rear surface 210B of the housing 210. In some embodiments (not shown), the fingerprint sensor may be disposed on the rear surface 210B as well as on the front surface 210A (e.g., the display 201) of the housing 210. The electronic device 101 may further include other types of sensor modules (not shown), for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor (not shown). The sensor module (not shown) may be designed in various manners such as installation of only some sensor modules or addition of a new sensor module according to the structure of the electronic device 101, not limited to the above structure.

According to an embodiment, the camera modules 205, 212, and 213 may include, for example, a front camera module 205 disposed on the front surface 210A of the electronic device 101, and a rear camera module 212 or a flash 213 disposed on the rear surface 210B of the electronic device 101. Each of the camera modules 205 and 212 may include one or more lenses, an image sensor, or an image signal processor. The flash 213 may include, for example, a light emitting diode (LED) or a xenon lamp. In some embodiments, two or more lenses (an IR camera, a wide-angle lens, and a telephoto lens) and image sensors may be arranged on one surface of the electronic device 101. The camera modules 205, 212, and 213 may be designed in various manners such as installation of only some camera modules or addition of a new camera module according to the structure of the electronic device 101, not limited to the above structure.

According to an embodiment, the electronic device 101 may include a plurality of camera modules (e.g., a dual camera or a triple camera) each having a different attribute (e.g., angle of view) or function. For example, a plurality of camera modules 205 and 212 including lenses having different angles of view may be configured, and the electronic device 101 may control changing of the angles of view of the camera modules 205 and 212 implemented in the electronic device 101 based on a user selection. For example, at least one of the plurality of camera modules 205 and 212 may be a wide-angle camera, and at least one other camera module 205 and 212 may be a telephoto camera. Similarly, at least one of the plurality of camera modules 205 and 212 may be a front camera, and at least one other camera module 205 and 212 may be a rear camera. Also, the plurality of camera modules 205 and 212 may include at least one of a wide-angle camera, a telephoto camera, or an IR camera (e.g., a time of flight (TOF) camera or a structured light camera). According to an embodiment, the IR camera may be operated as at least a part of the sensor module. For example, the TOF camera may be operated as at least a part of a sensor module (not shown) for detecting a distance to a subject.

According to an embodiment, the key input devices 217 may be arranged on the side surface 210C of the housing 210. In other embodiments, the electronic device 101 may not include some or any of the above key input devices 217, and the key input devices 217 which are not included may be implemented in other forms such as soft keys on the display 201. In some embodiments, the key input devices may include a sensor module (not shown) disposed on the rear surface 210B of the housing 210.

According to an embodiment, a light emitting element (not shown) may be disposed, for example, on the front surface 210A of the housing 210. The light emitting element (not shown) may provide, for example, state information about the electronic device 101 in the form of light. In other embodiments, the light emitting element (not shown) may provide a light source interworking, for example, with an operation of the front camera module 205. The light emitting element (not shown) may include, for example, an LED, an IR LED, or a xenon lamp.

According to an embodiment, the connector holes 208 and 209 may include a first connector hole 208 that may accommodate a connector (e.g., a universal serial bus (USB) connector) for transmitting and receiving power and/or data to and from an external electronic device, or a second connector hole 209 (e.g., an earphone jack) that may accommodate a connector for transmitting and receiving an audio signal to and from an external electronic device. The connector holes 208 and 209 may be designed in various manners such as installation of only some connector hole or addition of a new connector hole according to the structure of the electronic device 101, not limited to the above structure.

According to an embodiment, the camera module 205 and/or a sensor module (not shown) may be disposed in the internal space of the electronic device 101 to communicate with the external environment through a specified area of the display 201 and the front plate 202. For example, the specified area may be an area in which pixels are not disposed on the display 201. In another example, the specified area may be an area in which pixels are disposed on the display 201. When viewed from above the display 201, at least a part of the specified area may overlap with the camera module 205 or the sensor module. In another example, some sensor module may be disposed in the internal space of the electronic device to perform its function without being visually exposed through the front plate 202.

Figure 3:
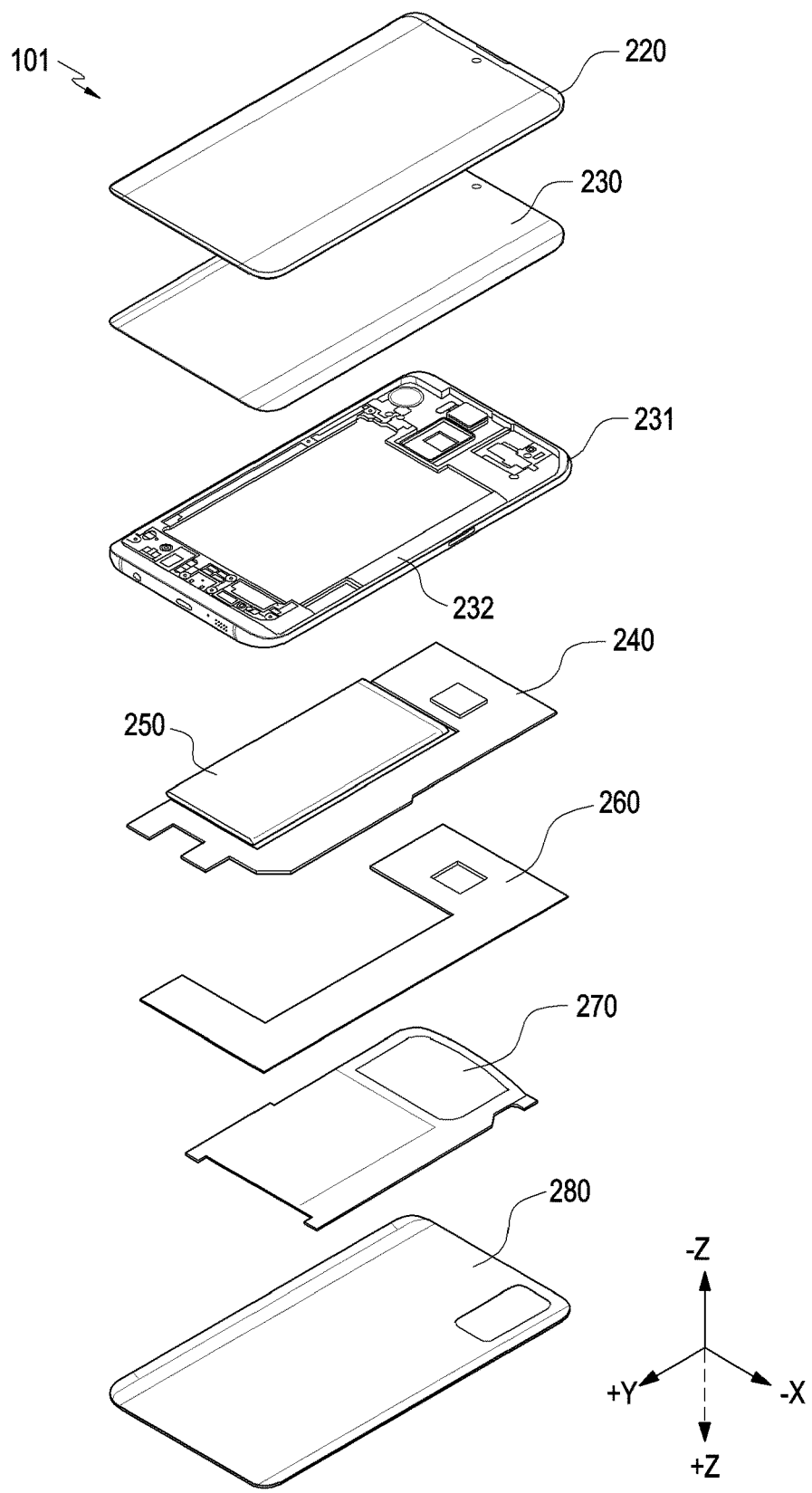
FIG. 3 illustrates an exploded perspective view illustrating an electronic device according to various embodiments.

FIG. 3 illustrates an exploded perspective view illustrating an electronic device according to various embodiments of the disclosure.

Referring to FIG. 3, the electronic device 101 (e.g., the electronic device 101 of FIGS. 2A and 2B) may include a front plate 220 (e.g., the front plate 202 of FIG. 2A), a display 230 (e.g., the display 201 of FIG. 2A), a first support member 232 (e.g., a bracket), a main printed circuit board (PCB) 240 (e.g., a PCB, a flexible PCB (FPCB), or a rigid flexible PCB (RFPCB)), a battery 250, a second support member 260 (e.g., a rear case), an antenna 270, and a rear plate 280 (e.g., the rear plate 211 of FIG. 2B). In some embodiments, the electronic device 101 may not be provided with at least one (e.g., the first support member 232 or the second support member 260) of the components or may further include other components. At least one of the components of the electronic device 101 may be the same as or similar to at least one of the components of the electronic device 101 of FIG. 2A and FIG. 2B, and a redundant description will be avoided herein.

According to an embodiment, the first support member 232 may be disposed inside the electronic device 101 and coupled to a side bezel structure 231 or integrally formed with the side bezel structure 231. The first support member 232 may be formed of, for example, a metallic material or a non-metallic material (e.g., a polymer). The first support member 232 may have one surface coupled to the display 230 and the other surface coupled to the PCB 240. The PCB 240 may have a processor, memory, or an interface attached thereon. The processor may include, for example, at least one of a central processing unit (CPU), an application processor, a graphic processing unit, an image signal processor, a sensor hub processor, or a communication processor. According to an embodiment, the PCB 240 may include an FPCB-type radio frequency cable (FRC). For example, the PCB 240 may be disposed on at least a part of the first support member 232, and electrically coupled to an antenna module (e.g., the antenna module 197 of FIG. 1) and a communication module (e.g., the communication module 190 of FIG. 1).

According to an embodiment, the memory may include, for example, a volatile memory or a non-volatile memory.

According to an embodiment, the interface may include, for example, an HDMI, a USB interface, an SD card interface, or an audio interface. The interface may electrically or physically couple, for example, the electronic device 101 to an external electronic device, and may include a USB connector, an SD card/multimedia card (MMC) connector, or an audio connector.

According to one embodiment, the battery 250 is a device for supplying power to at least one component of the electronic device 101, and may include, for example, a non-rechargeable primary cell, a rechargeable secondary cell, or a fuel battery. At least a part of the battery 250 may be disposed on the substantially same plane with, for example, the PCB 240. The battery 250 may be integrally disposed inside the electronic device 101, or may be disposed detachably from the electronic device 101.

According to an embodiment, the second support member 260 (e.g., the rear case) may be disposed between the PCB 240 and the antenna 270. For example, the second support member 260 may include one surface coupled with at least one of the PCB 240 or the battery 250 and the other surface coupled with the antenna 270.

According to an embodiment, the antenna 270 may be disposed between the rear plate 280 and the battery 250. The antenna 270 may include, for example, a near field communication (NFC) antenna, a wireless charging antenna, and/or a magnetic secure transmission (MST) antenna. The antenna 270 may, for example, perform short-range communication with an external electronic device or wirelessly transmit/receive power used for charging to/from an external electronic device. For example, the antenna 270 may include a coil for wireless charging. In other embodiments, an antenna structure may be formed by a part of the side bezel structure 231 or the first support member 232, or a combination thereof.

According to various embodiments, the rear plate 280 may form at least a part of the rear surface (e.g., the rear surface 210B of FIG. 2B) of the electronic device 101.

The electronic device 101 illustrated in FIGS. 2A, 2B and 3 has a bar-type or plate-type outward appearance, which should not be construed as limiting the disclosure. For example, the illustrated electronic device may be a part of a rollable electronic device or foldable electronic device. A "rollable electronic device" refers to an electronic device in which a display (e.g., the display 230 of FIG. 3) is bendable to be deformed and thus partially wound or rolled or accommodated in a housing (e.g., the housing 210 of FIG. 2)). According to a user need or interest, the rollable electronic device may increase a view area by unfolding the display or exposing a larger area of the display to the outside. A "foldable electronic device" may refer to an electronic device in which a display is foldable such that two different areas of the display face each other or in opposite directions. In general, the display may be folded with two different areas facing each other or in opposite directions in a portable state, whereas the user may unfold the display with the two different areas of the display being substantially flat in an actual use state, in the foldable electronic device. In some embodiments, the electronic device 101 according to various embodiments of the disclosure may be interpreted as including not only a portable electronic device such as a smart phone, but also various other electronic devices such as a laptop computer or a home appliance.

Figure 4:
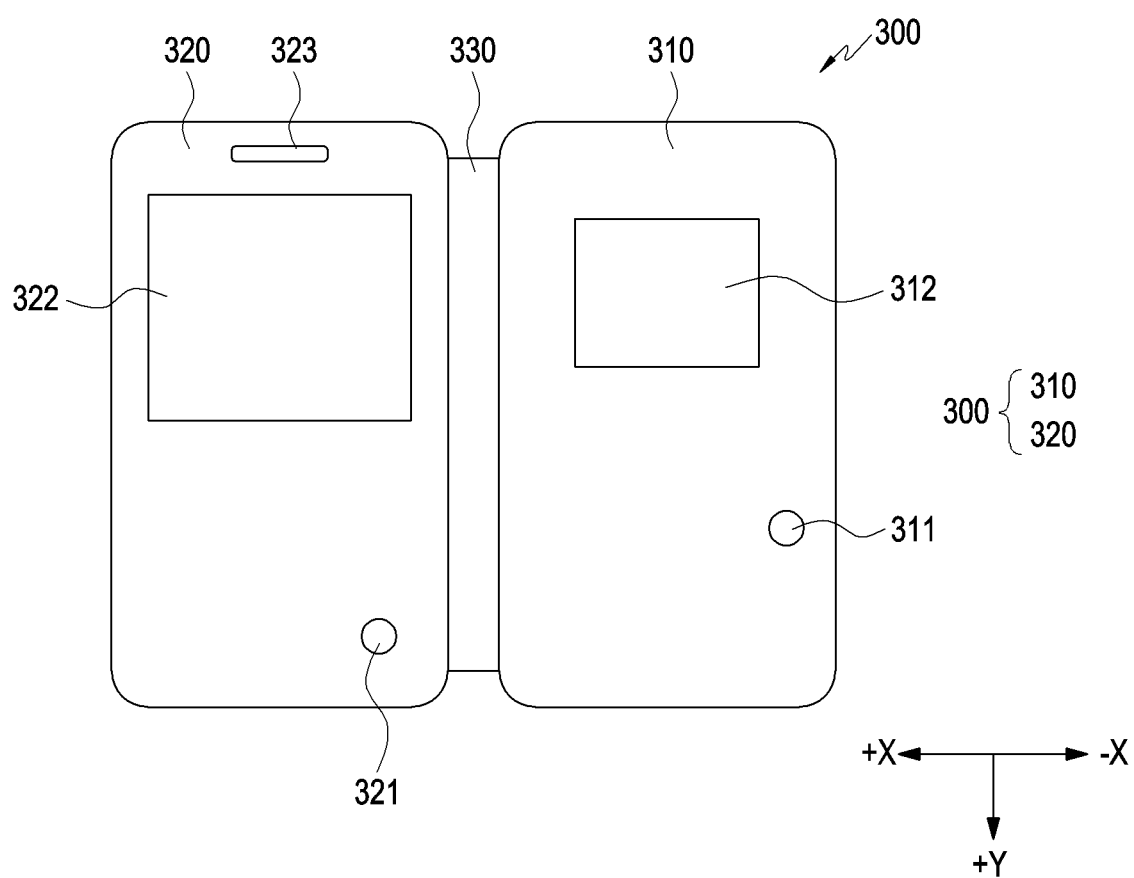
FIG. 4 illustrates a diagram illustrating a cover (e.g., a flip cover) attachable to an electronic device according to various embodiments.

FIG. 4 illustrates a diagram illustrating a cover 300 attachable to an electronic device according to various embodiments.

According to various embodiments, the cover 300 may be a cover manufactured integrally with a part (e.g., a rear plate) of a housing of an electronic device (e.g., the electronic device 101 of FIGS. 1 to 3) to be a part of the electronic device 101, or an accessory cover that is manufactured separately from the electronic device and coupled with the electronic device. In describing various embodiments of the disclosure, "couple" may include any form in which a first component is physically connected to a second component, such as mounting, attachment, and so on, and any form in which the first component is removed (detached) from the second component and reattached to the second component after the combination. The following embodiments will be given in the context of an accessory cover as a separate component combinable with an electronic device, for convenience.

Referring to FIG. 4, the cover 300 may include a first cover part 310 for covering at least a part of an electronic device (e.g., the electronic device 101 of FIGS. 1 to 3) and a second cover part 320 that covers at least a part of the electronic device 101 and is foldable (or rotatable) with respect to the first cover part 310. The first cover part 310 and the second cover part 320 may be rotatably coupled to each other by a connecting member 330. The electronic device 101 illustrated in FIGS. 2A, 2B and 3 is a bar type, and according to an embodiment, the first cover part 310 may be a part substantially coupled with (or attached to) a housing of the electronic device and fixed to the housing, and the second cover part 320 may be a part of a flip cover, which may cover or open substantially the entire display part of the electronic device. According to other embodiments, while not shown in the drawings, when the electronic device 101 includes an extendable display (e.g., when the electronic device 101 is a foldable electronic device including a first housing structure and a second housing structure), the first cover part 310 may be formed to at least partially cover a part (e.g., the first housing structure) of the electronic device 101, and the second cover part 320 may be formed to at least partially cover the other part (e.g., the second housing structure) of the electronic device 101.

The cover 300 may be fully unfolded, at least partially folded, or fully folded. This may mean that the first cover part 310 and the second cover part 320 may be fully unfolded, at least partially folded, or fully folded with respect to each other. When it is said that the first cover part 310 and the second cover part 320 are fully unfolded, this may mean that the first cover part 310 and the second cover part 320 are located on substantially the same plane (e.g., an XY plane). When it is said that the first cover part 310 and the second cover part 320 are fully folded, this may mean that the first cover part 310 and the second cover part 320 are stacked in one direction (e.g., in a Z-axis direction), which includes placing the second cover part 320 on the first cover part 310, that is, in-folding or placing the first cover part 320 on the second cover part 320, that is, out-folding. When it is said that the first cover part 310 and the second cover part 320 are at least partially folded with respect to each other, it may mean an intermediate state between the fully unfolded state and the fully folded state.

Figure 5:
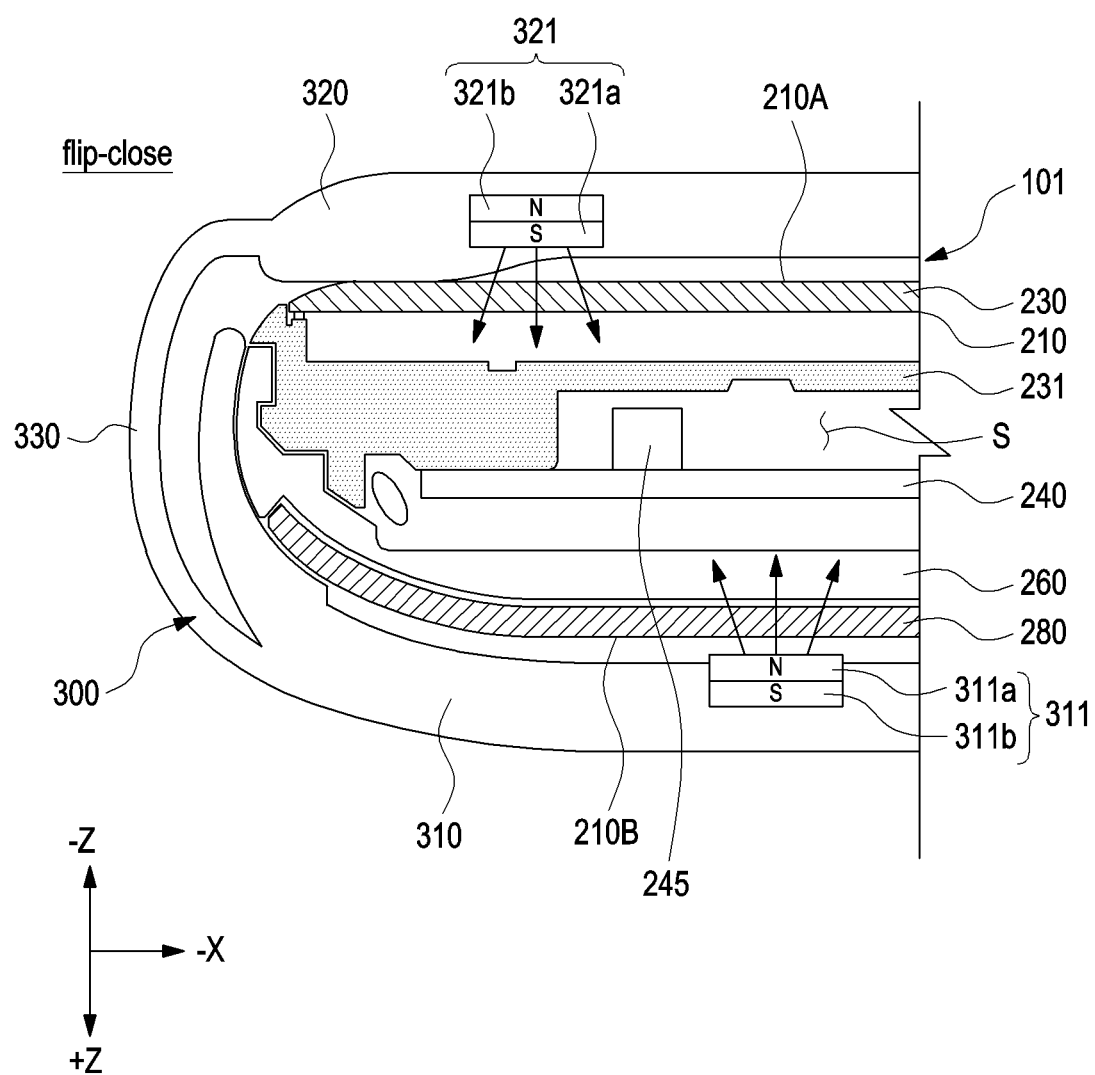
FIG. 5 illustrates a cross-sectional view illustrating a cover attached to an electronic device according to a first state (a folded-in state).
Figure 6:
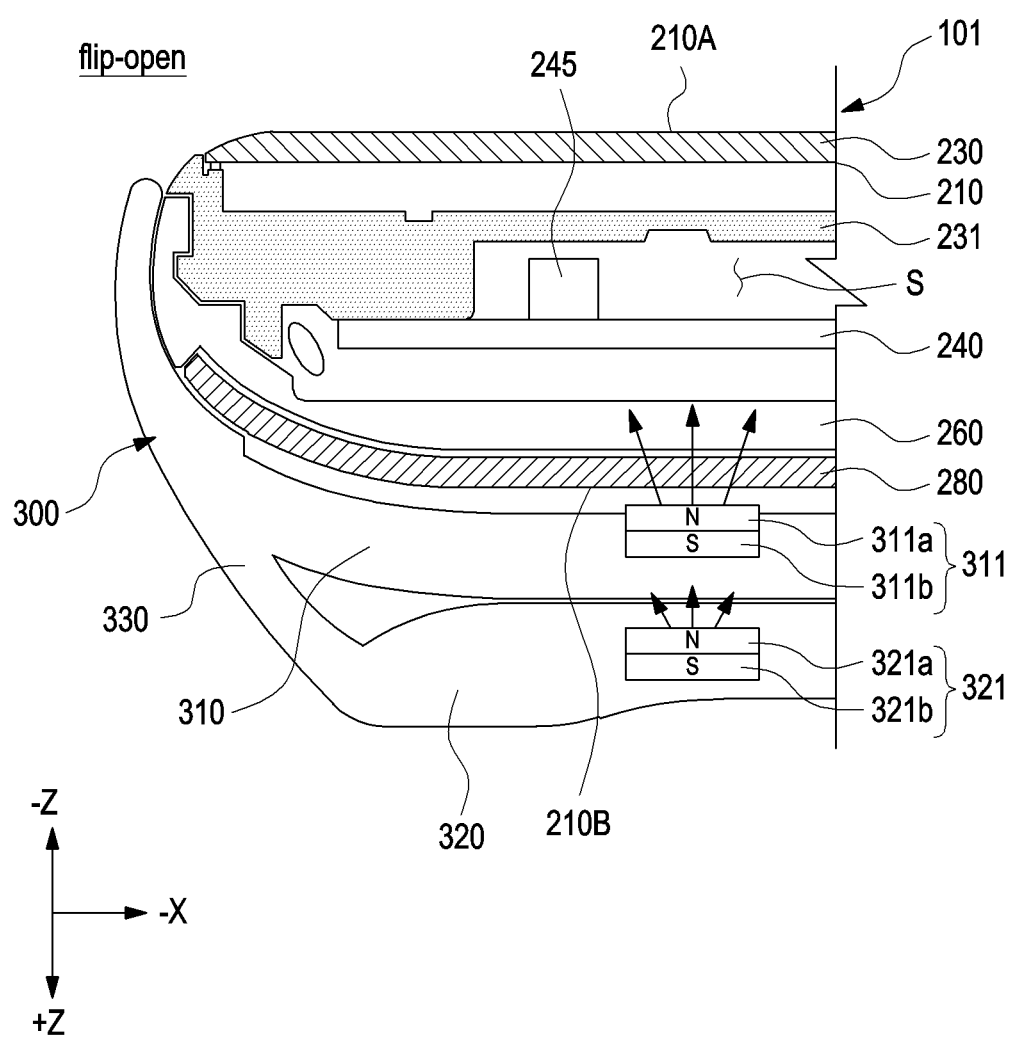
FIG. 6 illustrates a cross-sectional view illustrating a cover attached to an electronic device according to a second state (a folded-out state).
Figure 7:
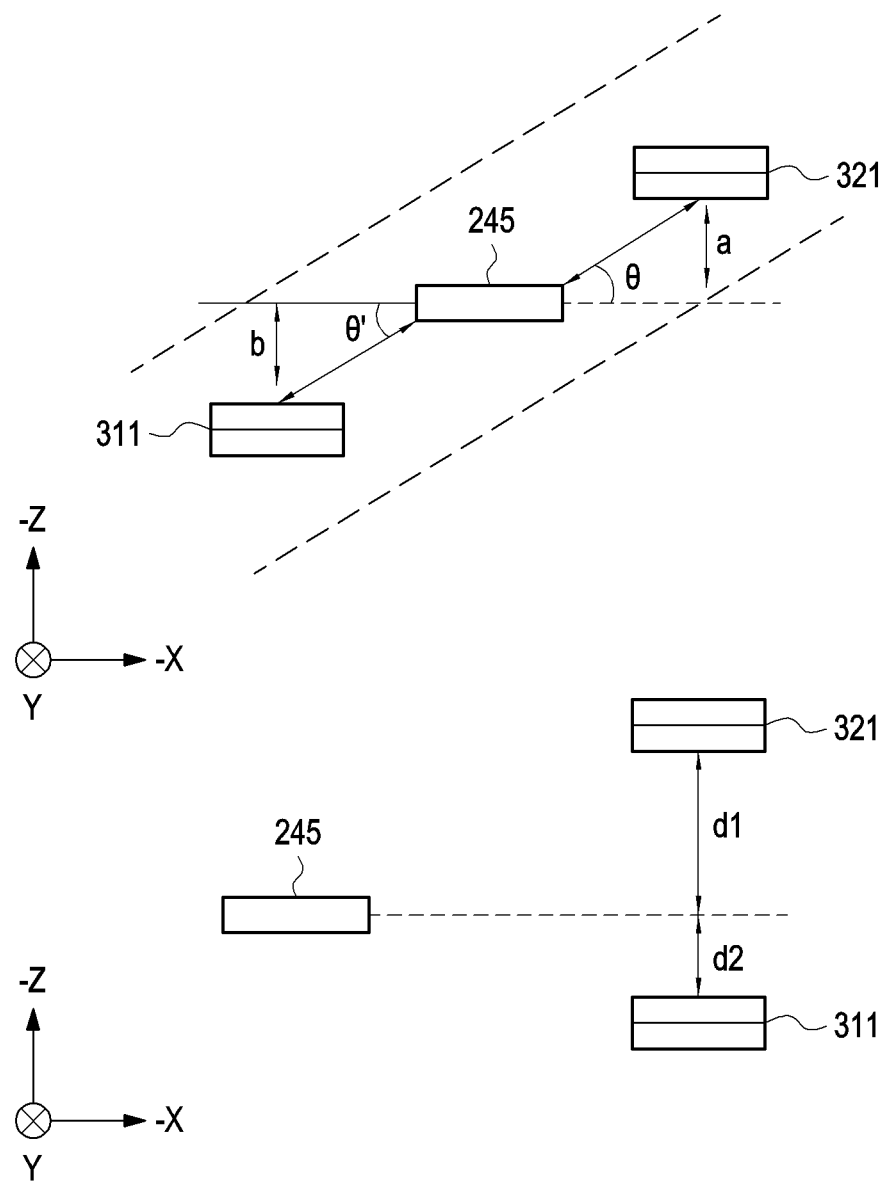
FIG. 7 illustrates a conceptual diagram illustrating positions at which a first magnetic member and a second magnetic member are disposed according to various embodiments.

FIG. 4 illustrates the fully unfolded state between the first cover part 310 and the second cover part 320 (hereinafter, referred to as a "third state" (or "second open state")). With reference to FIGS. 5 and 6 to be described later, a folded-in state (referred to as a "first state" (or "closed state")) and a folded-out state (referred to as a "second state" (or "first open state")) between the first cover part 310 and the second cover part 320 will be described in more detail. Although the intermediate state (referred to as a "fourth state") in which the first cover part 310 and the second cover part 320 are at least partially folded with respect to each other is not shown separately, the description of the third state may be applied to the fourth state.

The cover 300 may form an inner space for accommodating the electronic device 101 on one side (e.g., the first cover part 310), and when the electronic device 101 is accommodated in the inner space, one surface (e.g., the front surface of the display) of the electronic device 101 may be exposed to the outside. According to an embodiment, a transparent member 322 may be provided in the second cover part 320, so that even when the second cover part 320 is folded in with respect to the first cover part 310, the one surface of the electronic device 101 may be exposed to the outside. According to an embodiment, the cover 300 may further include at least one opening 323, and even when the second cover part 320 is folded in with respect to the first cover part 310, an incoming or outgoing call may be made through the at least one opening 323. The sizes, positions, and numbers of the transparent member 322 and the opening 323 may vary from one embodiment to another, not limited to any specific embodiment including the embodiments shown in the drawings.

The cover 300 may be configured to protect the electronic device 101 from external impacts (e.g., physical and chemical impacts). According to various embodiments, the cover 300 may be formed to have a size corresponding to the size and specification of the electronic device 101. In addition, the cover 300 may be formed in various colors or textures to make the appearance of the electronic device enhanced, thereby revealing a user's personality. Accordingly, the user may attach the cover 300 to the electronic device 101 in order to diversify the exterior design. In this way, the cover 300 may be used not only for the purpose of protecting the electronic device 101 but also as a means for increasing the variety of exterior designs. The design of the cover 300 as well as the appearance of the electronic device 101 may be a very important factor in terms of customer attraction. Accordingly, according to various embodiments of the disclosure, the cover 300 is given a unique identifier (ID) for a certificate of authenticity, and the electronic device 101 may be provided with a component (e.g., an antenna (e.g., the antenna 270 of FIG. 3)) that identifies the unique ID of the cover 300. For example, the cover 300 may include a wireless authentication module 312 that stores information about the unique ID and performs a wireless authentication operation with an antenna module (e.g., the antenna module 197 of FIG. 1) of the electronic device 101. According to an embodiment, the wireless authentication module 312 may be disposed in the first cover part 310 combinable with the housing of the electronic device 101.

According to various embodiments of the disclosure, when the cover 300 is attached to the electronic device 101, at least some of the functions of the electronic device 101 may be activated (e.g., wake-up mode) or deactivated (e.g., sleep mode) according to the arrangement state of the cover 300 and the electronic device 101.

According to an embodiment, when the second cover part 320 is folded in with respect to the first cover part 310 and covers substantially one surface (e.g., the front surface of the display) of the electronic device 101, the electronic device 101 may be considered to be in an unused state, for example, the sleep mode, and thus the display may be deactivated. However, even when the second cover part 320 is folded in with respect to the first cover part 310 and covers substantially the one surface (e.g., the front surface of the display) of the electronic device 101, a part of the display and a screen displayed on the display may be exposed to the outside through the transparent member 322. For example, information about the position of the transparent member 322 of the cover 300 may also be identified during authentication of the cover 300, and thus a processor (e.g., the processor 120 in FIG. 1) may activate a part of the display corresponding to the position of the transparent member 322 and deactivate the remaining part of the display.

According to other embodiments, when the second cover part 320 is folded out with respect to the first cover part 310 and covers the other surface (e.g., the rear surface) of the electronic device 101, the electronic device 101 may be considered to be in a used state, for example, the wake-up mode, and the display may be activated. Depending on the arrangement state of the cover 300 and the electronic device 101, at least some of the functions of the electronic device 101 may be activated (e.g., the wake-up mode) or deactivated (e.g., the sleep mode), thereby increasing use convenience. To this end, the cover 300 may include a magnetic member as a means for determining an arrangement relationship with the electronic device 101.

The cover 300 may include a first magnetic member 311 in the first cover part 310 and a second magnetic member 321 in the second cover part 320. According to an embodiment, the first magnetic member 311 may be provided to identify whether the electronic device 101 has been coupled with (or attached to or detached from) the first cover part 310, when the first cover part 310 of the cover 300 and the electronic device 101 are coupled with each other. The second magnetic member 321 may be provided whether the second cover part 310 is in the first state (the folded-in state) with respect to the first cover part 310 or in the second state (the folded-out state) with respect to the first cover part 310. It may be identified whether the second cover part 320 is in the first state or in the second state with respect to the first cover part 310, after the electronic device 101 is coupled with the first cover part 310.

FIG. 5 illustrates a cross-sectional view illustrating the cover 300 attached to the electronic device 101 according to the first state (the folded-in state). FIG. 6 illustrates a cross-sectional view illustrating the cover 300 attached to the electronic device 101 according to the second state (the folded-out state).

Referring to FIGS. 5 and 6 together, the electronic device 101 may include the housing 210 which includes a first surface 210B facing a first direction (e.g., a +Z direction) and a second surface 210A facing a second direction (e.g., a −Z direction) opposite to the first surface 210B, with an inner space S between the first surface 210B and the second surface 210A, a board 240 (e.g., the main PCB 240 of FIG. 3) disposed in the inner space S, a geomagnetic sensor 245 disposed on the board 240, and a processor (e.g., the processor 120 of FIG. 1).

According to various embodiments, the housing 210 may be substantially identical to the housing 210 described with reference to FIGS. 2A and 2B, and may provide the second surface 210A by the display 201 and the first surface 210B by the rear plate 280. According to an embodiment, the housing 210 may further include the side bezel structure 231, the second support member 260 (the rear case), and the rear plate 280. While the rear plate 280 is shown as separated from the side bezel structure 231 and the second support member 260 in FIGS. 5 and 6, the disclosure is not limited thereto. Various embodiments may be available, such as integration of the rear plate 280 and the second support member 260 and integration of the second support member 260 and the side bezel structure 231.

According to various embodiments of the disclosure, without a separate hall IC, the electronic device 101 may determine whether the cover 300 has been attached or detached by identifying whether a magnetic member disposed on the cover 300 is in proximity by using the geomagnetic sensor 245 in the inner space S of the housing 210.

According to an embodiment, when the first cover part 310 including the first magnetic member 311 is disposed to cover the first surface 210B from the first direction (e.g., the +Z direction) of the electronic device 101, the geomagnetic sensor 245 may detect a first magnetic force, and when the second cover part 320 including the second magnetic member 321 is disposed to cover the second surface 210A from the second direction (e.g., the −Z direction) of the electronic device, the geomagnetic sensor 245 may detect a second magnetic force. In this case, the processor (e.g., the processor 120 of FIG. 1) may identify whether the cover has been attached to or detached from the electronic device 101, along with determining magnetic north based on information about the identified magnetic forces.

For example, the geomagnetic sensor 245 may detect the first magnetic force, which is the sum of a magnetic force from the first magnetic member 311 at a fixed position in a state in which the electronic device 101 is coupled with the first cover part 310 and a magnetic force from the second magnetic member 321 at a variable position. The first magnetic force may be the sum of the magnetic force of the first magnetic member 311 and the magnetic force of the second magnetic member 321, which are measured in a state where the second cover part 320 does not cover either of the second surface 210A or the first cover part 310, that is, in the third state (the fully unfolded state) or the fourth state (the intermediate state).

According to an embodiment, the first magnetic force may include information about a direction in which a magnetic field is formed. For example, the first magnetic force is a value measured when the first cover part 310 including the first magnetic member 311 is attached to the first surface 210B of the electronic device 101, and may include information about a first direction formed with respect to the geomagnetic sensor 245. In the third state (the fully unfolded state) or the fourth state (the intermediate state), the second magnetic member 321 may affect the geomagnetic sensor 245 negligibly or slightly, compared to the first magnetic member 311. That is, while the first magnetic member 311 is dominantly affecting the geomagnetic sensor 245, the processor (e.g., the processor 120 of FIG. 1) may identify the magnetic force measured at the geomagnetic sensor 245 as the first magnetic force and determine that the cover 300 (e.g., the first cover part 310) has been attached to the electronic device 101. According to various embodiments, when determining that the electronic device 101 and the cover 300 are coupled with each other, the processor (e.g., the processor 120 of FIG. 1) may perform a wireless authentication operation for determining whether the cover 300 is genuine, based on information received from a wireless authentication module (e.g., the wireless authentication module 312 of FIG. 4). According to various embodiments, information about the first magnetic force and instructions for performing the operation, when the first magnetic force value is identified, may be pre-stored in a memory (e.g., the memory 130 of FIG. 1).

In another example, the geomagnetic sensor 245 may detect the second magnetic force, which is the sum of a magnetic force from the first magnetic member 311 at a fixed position in a state in which the electronic device 101 is coupled with the first cover part 310 and a magnetic force from the second magnetic member 321 at a fixed position in a state in which the second cover part 320 covers the second surface 210A of the electronic device 101, that is, in the first state (the folded-in state).

Referring to FIG. 5, the geomagnetic sensor 245 is shown as detecting the second magnetic force, while the second cover part 320 covers the second surface 210A of the electronic device 101. The geomagnetic sensor 245 may be affected by the magnetic force of the second magnetic member 321 as well as the magnetic force of the first magnetic member 311, and the magnetic force (e.g., the second magnetic force) in this case may have different magnitude and direction components from those of the first magnetic force. According to some embodiments, the second magnetic force may also include information about a direction in which the magnetic field is formed. For example, the second magnetic force may be a value measured when the second cover part 320 including the second magnetic member 321 is located on the second surface 210A of the electronic device 101, and may include information about a second direction formed with respect to the geomagnetic sensor 245.

According to various embodiments, when identifying the second magnetic force different from the first magnetic force, the processor (e.g., the processor 120 of FIG. 1) may perform an operation other than the aforementioned wireless authentication operation. For example, when identifying the second magnetic force, the processor may deactivate the entire display or activate only a part of the display, considering that the second cover part 320 covers the second surface 210A of the electronic device 101 and thus the user does not recognize visual information to be displayed on the display. When only part of the display is activated, a screen displayed on the display may be exposed to the outside through a transparent member (e.g., the transparent member 322 of FIG. 4). In addition to the above-described operation, various embodiments are available for operations that the processor may perform, when the second magnetic force is identified. In addition, the information about the second magnetic force and instructions for performing the operation, when the second magnetic force is identified, may also be pre-stored in the memory (e.g., the memory 130 of FIG. 1).

According to an embodiment, when the second cover part 329 is disposed to cover the first cover part 310 from the first direction (e.g., the +Z direction) of the electronic device 101 in the state where the first cover part 310 including the first magnetic member 311 is disposed to cover the first surface 210B from the first direction (e.g., the +Z direction) of the electronic device 101, that is, in the second state (the folded-out state), the geomagnetic sensor 245 may detect a third magnetic force. For example, referring to FIG. 6, the geomagnetic sensor 245 may detect the third magnetic force, which is the sum of a magnetic force from the first magnetic member 311 at a fixed position in the state where the electronic device 101 is coupled with the first cover part 310 and a magnetic force from the second magnetic member 321 at a fixed position in the state where the second cover part 320 covers the first cover part 310. In the embodiment illustrated in FIG. 6, the geomagnetic sensor 245 may be affected by the magnetic force from the second magnetic member 321 as well as the magnetic force from the first magnetic member 311, and the magnetic force (e.g., the third magnetic force) in this case may have different magnitude and direction components from those of the first and second magnetic forces. According to an embodiment, the third magnetic force may also include information about a direction in which a magnetic field is formed. For example, the third magnetic force may be a value measured when the second cover part 320 including the second magnetic member 321 is located on the first cover part 310 attached to the electronic device 101, and may include information about the first direction formed with respect to the geomagnetic sensor 245.

According to various embodiments, the first magnetic member 311 may include a (1-1)th pole 311a facing the electronic device 101 and a (1-2)th pole 311b facing in a direction opposite to the (1-1)th pole 311a, and the second magnetic member 321 may include a (2-1)th pole 321a and a (2-2)th pole 321b, which face the electronic device 101, in the state where the cover 300 is attached to the electronic device 101. According to an embodiment, the (1-1)th pole 311a and the (1-2)th pole 311b may be formed to have different polarities. For example, when the (1-1)th pole 311a is an N pole, the (1-2)th pole 311b may be an S pole. In the embodiment illustrated in FIG. 6, the third magnetic force acting on the geomagnetic sensor 245 may be greater than the first magnetic force and the second magnetic force due to the first magnetic member 311 and the second magnetic member 321 oriented in the same polarity direction. According to various embodiments, when identifying the third magnetic force, the processor (e.g., the processor 120 of FIG. 1) may perform an operation other than the aforementioned wireless authentication operation. For example, when identifying the third magnetic force, the processor may perform an operation of activating the entire display, considering that the user may use the display. Various embodiments are available for operations that the processor may perform when the third magnetic force is identified. In addition, information about the third magnetic force and instructions for performing the operation when the third magnetic force value is identified may also be pre-stored in the memory (e.g., the memory 130 of FIG. 1).

The electronic device according to various embodiments of the disclosure may be provided to perform a function of determining magnetic north as well as a cover identification function without a separate hall IC by applying the geomagnetic sensor 245 attached for determining magnetic north and a structure in which the magnetic members having different polarities are attached to the cover 300.

FIG. 7A illustrates a conceptual diagram illustrating a method of disposing two different magnetic members according to embodiment. FIG. 7B illustrates a conceptual diagram illustrating a method of disposing two different magnetic members according to other embodiments.

The first magnetic member 311 disposed in the first cover part 310 and the second magnetic member 321 disposed in the second cover part 320 may be freely disposed in the cover. However, when the magnetic members are too close to the geomagnetic sensor 245, an azimuth error of the geomagnetic sensor 245 may occur. Accordingly, the first magnetic member 311 and the second magnetic member 321 may be disposed at positions that do not affect an operation of determining magnetic north. A threshold that affects the magnetic north determination operation from the geomagnetic sensor 245 may be set for each of three axes (X, Y, and X axes), and the first magnetic member 311 and the second magnetic member 321 may be disposed at distances (separation distances) that do not exceed the threshold.

According to an embodiment, the first magnetic member 311 and the second magnetic member 321 may be disposed at symmetrical positions with respect to the geomagnetic sensor 245, as illustrated in FIG. 7A, or at positions spaced apart from each other by predetermined distances d1 and d2 from a level at which the geomagnetic sensor 245 is disposed, as illustrated in FIG. 7B. The distance d1 between the first magnetic member 311 and the level may be equal to or different from the distance d2 between the second magnetic member 321 and the level. The first magnetic member 311 and the second magnetic member 321 may be placed at various positions according to the magnitude of a magnetic force of each magnetic member and various motions of the second cover part 320 rotatable with respect to the first cover part 310.

Figure 8A:
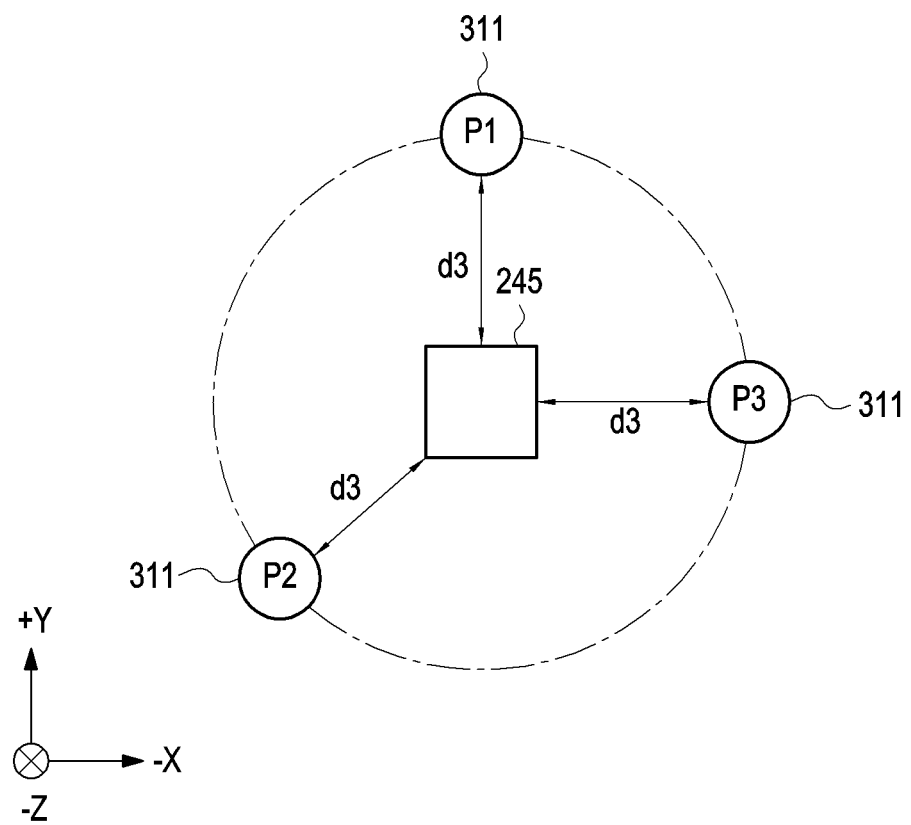
FIG. 8A illustrates a conceptual diagram illustrating a guide for determining a first position at which a first magnetic member is disposed around a geomagnetic sensor according to various embodiments.
Figure 8B:
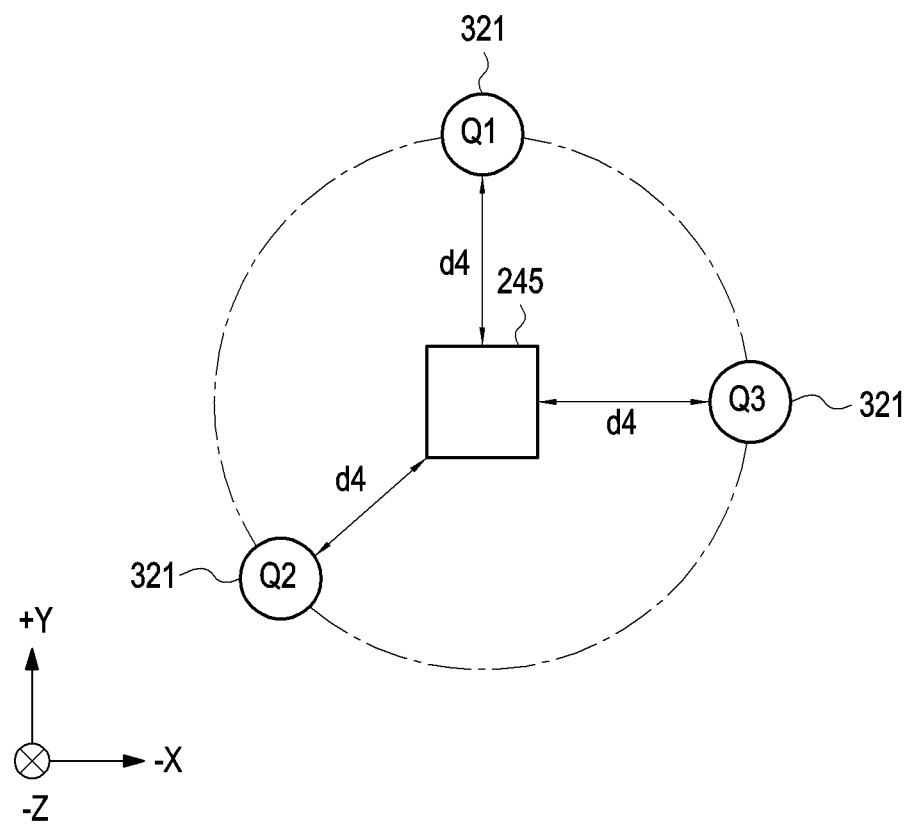
FIG. 8B illustrates a conceptual diagram illustrating a guide for determining a second position at which a second magnetic member is disposed around a geomagnetic sensor, according to various embodiments.

FIG. 8A illustrates a conceptual diagram illustrating a method of disposing the first magnetic member 311 with respect to the geomagnetic sensor 245 according to various embodiments. FIG. 8B illustrates a conceptual diagram illustrating a method of disposing the second magnetic member 321 with respect to the geomagnetic sensor 245 according to various embodiments.

FIGS. 8A and 8B illustrate a method of setting the positions of the first magnetic member 311 and the second magnetic member 321 with respect to the geomagnetic sensor 245 in a three-axis (X, Y, and Z-axis) spatial coordinate system.

According to an embodiment, the geomagnetic sensor 245 may be formed to be capable of determining magnetic north, regardless of whether the cover 300 is coupled with (attached to or detached from) the electronic device 101, and whether the electronic device 101 is placed in the first state (the folded-in state), the second state (the folded-out state), the third state (the fully unfolded state), or the fourth state (the intermediate state) after the cover 300 is coupled with the electronic device 101. However, the first magnetic member 311 and the second magnetic member 321 may be configured to be disposed at positions spaced apart from each other on each axis in the three-axis (X, Y, and Z-axis) spatial coordinate system, to prevent an azimuth error in determining magnetic north by the geomagnetic sensor 245.

A guide for disposing the first magnetic member 311 is illustrated in FIG. 8A, and a guide for disposing the second magnetic member 321 is illustrated in FIG. 8B. The first magnetic member 311 may be disposed at various positions P1, P2, and P3 around the geomagnetic sensor 245, and the second magnetic member 321 may also be disposed at various positions Q1, Q2, and Q3 around the geomagnetic sensor 245. The first magnetic member 311 and the second magnetic member 321 may be located outside minimum physical separation distances d3 and d4 (e.g., 2 mm) from the geomagnetic sensor 245 in consideration of the mobility of the cover. Further, the first magnetic member 311 and the second magnetic member 321 should be disposed at positions that minimize magnetic field interference with the geomagnetic sensor 245, which may be achieved by placing different magnetic members in two axial directions in the three-axis spatial coordinate system. For example, the first magnetic member 311 may be disposed at a position where a 1000 µT magnetic force is measured in the X-axis direction, and the second magnetic member 321 may be disposed at a position where a −1000 µT magnetic force is measured in the Y-axis direction. In this case, the position of the first magnetic member 311 and the magnetic force value at the position may be set as a baseline, and the mounting position of the second magnetic member 321 may be determined based on the baseline. As the first magnetic member 311 and the second magnetic member 321 are disposed to form dominant magnetic forces in different axial directions in this manner, magnetic field interference with the geomagnetic sensor 245 may be minimized, while changes in the magnetic force of the second cover part 320 in various states (the first to fourth states) with respect to the first cover part 310 may be easily tracked, thereby identifying a genuine cover and opening and closing of the cover.

According to various embodiments, to identify the genuine cover 300, magnetic members may be arranged at different positions for different genuine covers as various types of accessories. Alternatively or additionally, magnetic members with different magnetic force magnitudes may be arranged for different genuine covers. The processor (e.g., the processor 120 of FIG. 1) may determine which cover has been coupled with the electronic device 101 based on different magnetic force values measured in the three-axis spatial coordinate system by the geomagnetic sensor 245. In some genuine covers, for example, the first magnetic member 311 may be disposed at a position where a 1000 µT magnetic force is measured in the X-axis direction from the geomagnetic sensor 245, and the second magnetic member 321 may be disposed at a position where a −1000 µT magnetic force is measured in the Y-axis direction from the geomagnetic sensor 245. In contrast, the first magnetic member 311 may be disposed at a position where a 500 µT magnetic force is measured in the X-axis direction from the geomagnetic sensor 245, and the second magnetic member 321 may be disposed at a position where a 1000 µT magnetic force is measured in the Y-axis direction and a 500 µT magnetic force is measured in the Z-axis direction from the geomagnetic sensor 245, in another genuine cover. Various other embodiments may be applied.

Figure 9:
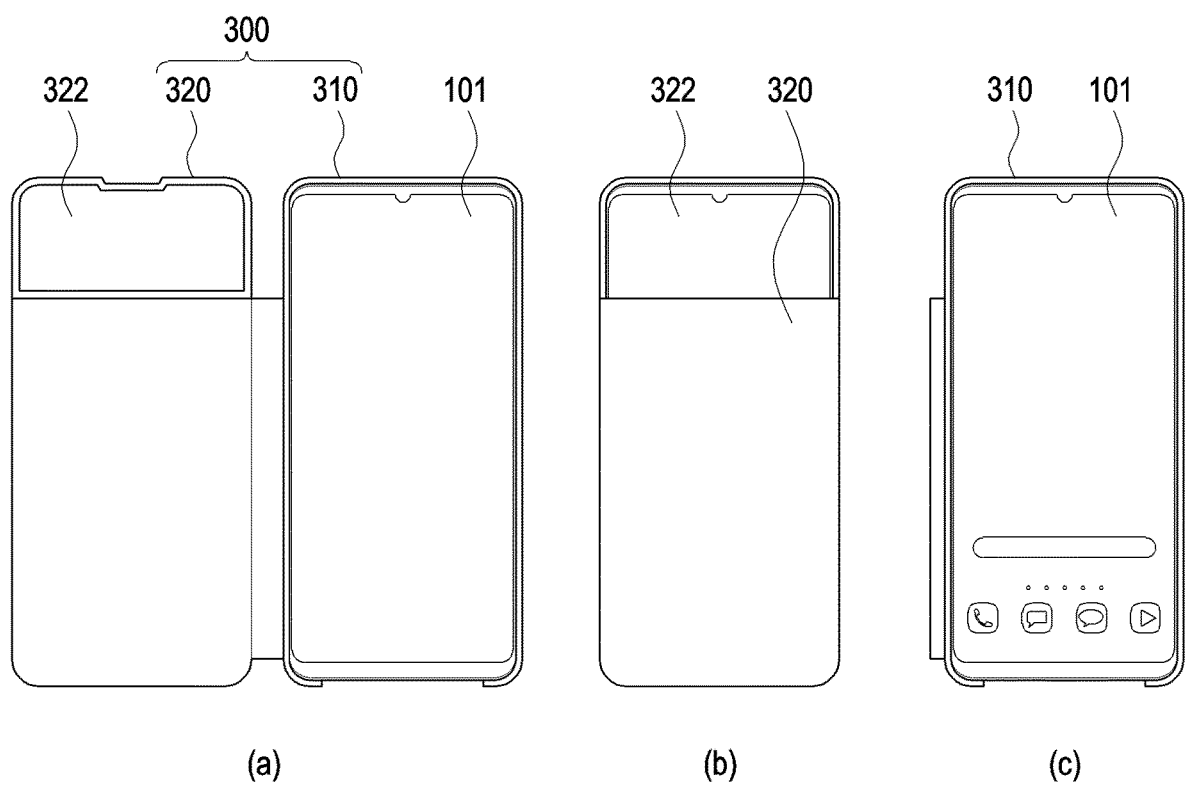
FIG. 9 illustrates a diagram illustrating various embodiments of a method of applying a correction coefficient, when a processor determines magnetic north.

FIG. 9 illustrates a diagrams illustrating various embodiments of a method of applying a correction coefficient, when a processor determines magnetic north.

Diagram (a) in FIG. 9 illustrates the third state (the state in which the first cover part 310 and the second cover part 320 are fully unfolded), diagram (b) in FIG. 9 illustrates the first state (the folded-in state) and diagram (c) in FIG. 9 illustrates the second state (the folded-out state).

When determining magnetic north based on information about a magnetic force identified by the geomagnetic sensor 245, the processor (e.g., the processor 120 of FIG. 1) may increase the accuracy of the magnetic north determination by applying a correction coefficient according to each of various states of the second cover part 320 with respect to the first cover part 310. For example, in the first state (the folded-in state), the processor may apply a first correction coefficient A in consideration of the influence of the first magnetic member (e.g., the first magnetic member 311 of FIG. 5) during magnetic north determination of the geomagnetic sensor 245, the influence of a wireless authentication module (e.g., the wireless authentication module 312 of FIG. 4) during genuine product authentication, and the influence of the second magnetic member (e.g., the second magnetic member 321 of FIG. 5). In the second state (the folded-out state), for example, the processor may apply a second correction coefficient B in consideration of the influence of the first magnetic member (e.g., the first magnetic member 311 of FIG. 6) during magnetic north determination of the geomagnetic sensor 245, the influence of the wireless authentication module (e.g., the wireless authentication module 312 of FIG. 4) during genuine product authentication, and the influence of the second magnetic member (e.g., the second magnetic member 321 of FIG. 6). In the third state (the fully unfolded state of the first cover part 310 and the second cover part 320) or the fourth state (the intermediate state), for example, the processor may apply a third correction coefficient C in consideration of the influence of the first magnetic member (e.g., the first magnetic member 311 of FIG. 4) during magnetic north determination of the geomagnetic sensor 245 and the influence of the wireless authentication module (e.g., the wireless authentication module 312 of FIG. 4) during genuine product authentication.

Figure 10:
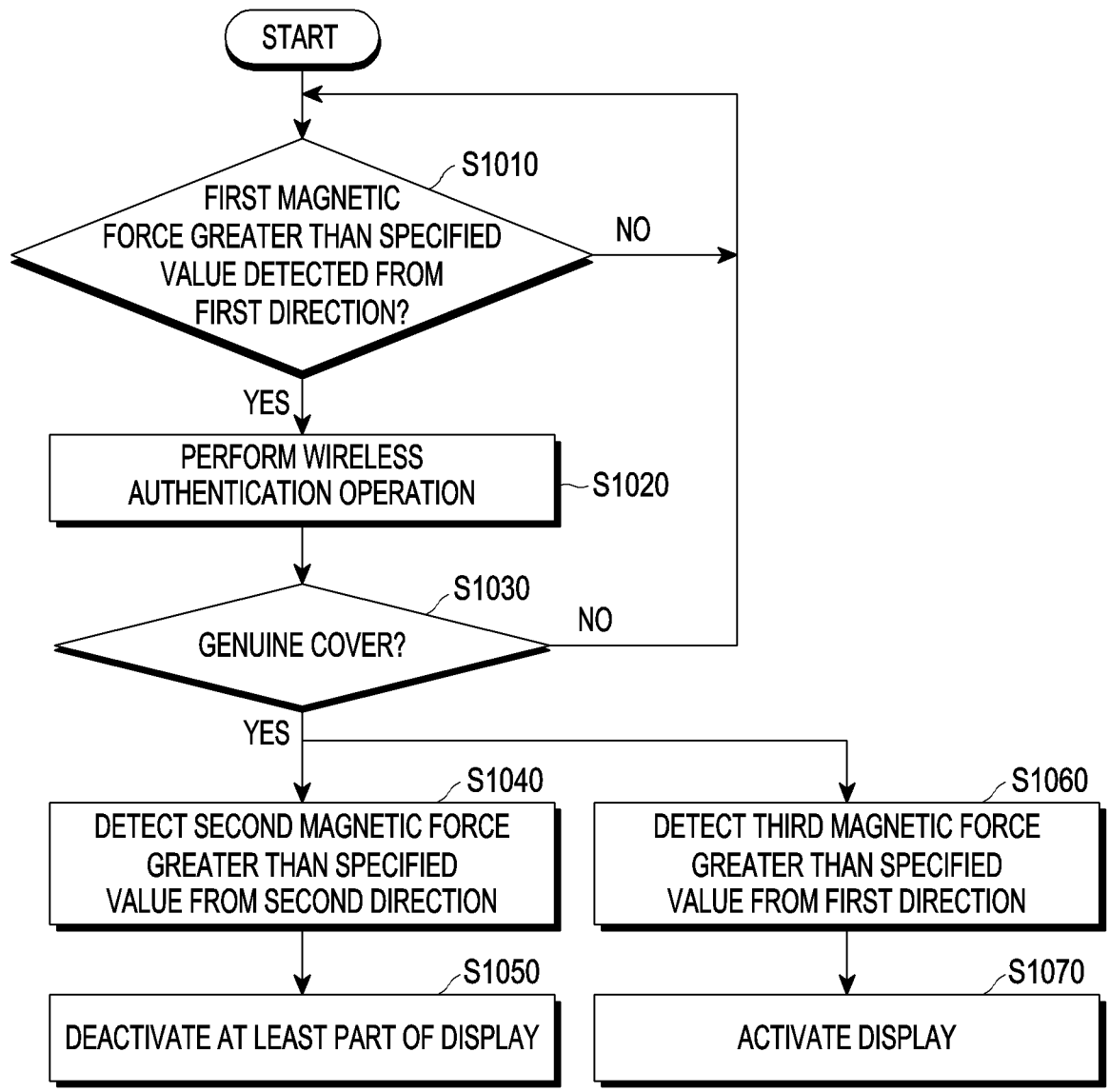
FIG. 10 illustrates a flowchart illustrating a method of controlling an electronic device according to various embodiments of the disclosure.

FIG. 10 illustrates a flowchart illustrating a method of controlling an electronic device according to various embodiments of the disclosure.

According to various embodiments of the disclosure, a method of controlling an electronic device (e.g., the electronic device 101 of FIG. 1) including a display (e.g., the display 201 of FIG. 5), an antenna (e.g., the antenna 270 of FIG. 3), a geomagnetic sensor (e.g., the geomagnetic sensor 245 of FIG. 5), and a processor (e.g., the processor 120 of FIG. 1), and combinable with a cover (e.g., the cover 300 of FIG. 4) may be provided.

The method of controlling an electronic device illustrated in FIG. 10 may be performed by the processor 120 based on a magnetic force measured in real time by the geomagnetic sensor 245. The magnetic force measured by the geomagnetic sensor 245 may include information about a direction of a magnetic field as well as a magnitude of the magnetic field.

In relation to operation S1010, the processor 120 may determine whether a first magnetic force greater than a predetermined value is detected from a first direction. The first direction may mean the +Z-axis direction in the embodiment illustrated in FIG. 5. The "predetermined value" may be a value stored in a memory (e.g., the memory 130 of FIG. 1). Upon detection of the first magnetic force greater than the predetermined value from the first direction, the processor 120 may perform a wireless authentication operation, determining that the first cover part (e.g., the first cover part 310 of FIG. 4) of the cover 300 has been coupled with the electronic device 101.

In relation to operations S1020 and S1030, the wireless authentication operation may be performed between the antenna 270 of the electronic device 101 and the wireless authentication module (e.g., the wireless authentication module 312 of FIG. 4) of the cover 300. Information about a unique ID for genuine product authentication may be stored in the wireless authentication module 312. This information may be received through the antenna 270 and analyzed by the processor 120 to determine whether the cover 300 is genuine. According to an embodiment, the electronic device 101 may further include a genuine product identification module and identify or authenticate whether the cover 300 is genuine by using genuine product information stored in the genuine product identification module.

When the cover 300 is identified as genuine, the processor 120 may determine whether a second magnetic force greater than a predetermined value has been detected from the second direction in relation to operation S1040. The second direction may mean the −Z-axis direction in the embodiment illustrated in FIG. 5. The "predetermined value" may be a value stored in the memory 130. When the second magnetic force greater than the predetermined value has been detected from the second direction, it may be considered that the second cover part of the cover 300 (e.g., the second cover part 320 of FIG. 4) has covered the display (e.g., the display 201 of FIG. 5) of the electronic device 101. In relation to operation S1050, at least a part of the display may be deactivated. When a transparent member (e.g., the transparent member 322 of FIG. 3) is formed on the second cover part 320, the processor 120 may perform an operation of activating the part of the display and deactivating the other part by reflecting information about the position of the transparent member.

When identifying the cover 300 as genuine, the processor 120 may determine whether a third magnetic force greater than a predetermined value has been detected from the first direction in relation to operation S1060. The "predetermined value" may be a value stored in the memory 130. When the third magnetic force greater than the predetermined value has been detected from the first direction, it may be considered that with the first cover part 310 of the cover 300 coupled with the electronic device 101, the second cover part 320 has covered the first cover part 310. In this case, it is assumed that the user uses the electronic device 101, and the display may be deactivated, in relation to operation S1070.

The processor may perform a function of determining magnetic north, together with the determination as to whether the first cover part 310 has been coupled with the electronic device 101, whether the second cover part 320 covers at least a part of the display 201 of the electronic device 101, and whether the second cover part 320 covers the first cover part 310, through the geomagnetic sensor. In this case, when determining the magnetic north, the processor may apply a correction coefficient according to whether the cover has been coupled with the electronic device.

According to various embodiments of the disclosure, because it may be determined whether the cover is attached to the electronic device without a hall IC sensor, performance degradation of various electronic components included in the electronic device may be prevented. Further, the electronic device determines whether the cover has been attached by means of another sensor (e.g., the geomagnetic sensor) disposed in the electronic device, without including a separate sensor for measuring a magnetic force (e.g., the hall IC sensor). Therefore, difficulty in mounting components inside the electronic device may be eliminated, manufacturing cost may be reduced, and the electronic device may be efficiently designed. Further, according to various embodiments of the disclosure, magnetic north may be determined successfully at the geomagnetic sensor, while it is determined whether the cover has been attached to the electronic device.

According to various embodiments of the disclosure, for other types of electronic devices, the orientations or positions of components including magnetic members may be identified through the geomagnetic sensor. A double foldable electronic device 400 as another type of electronic device will be described below.

Figure 11:
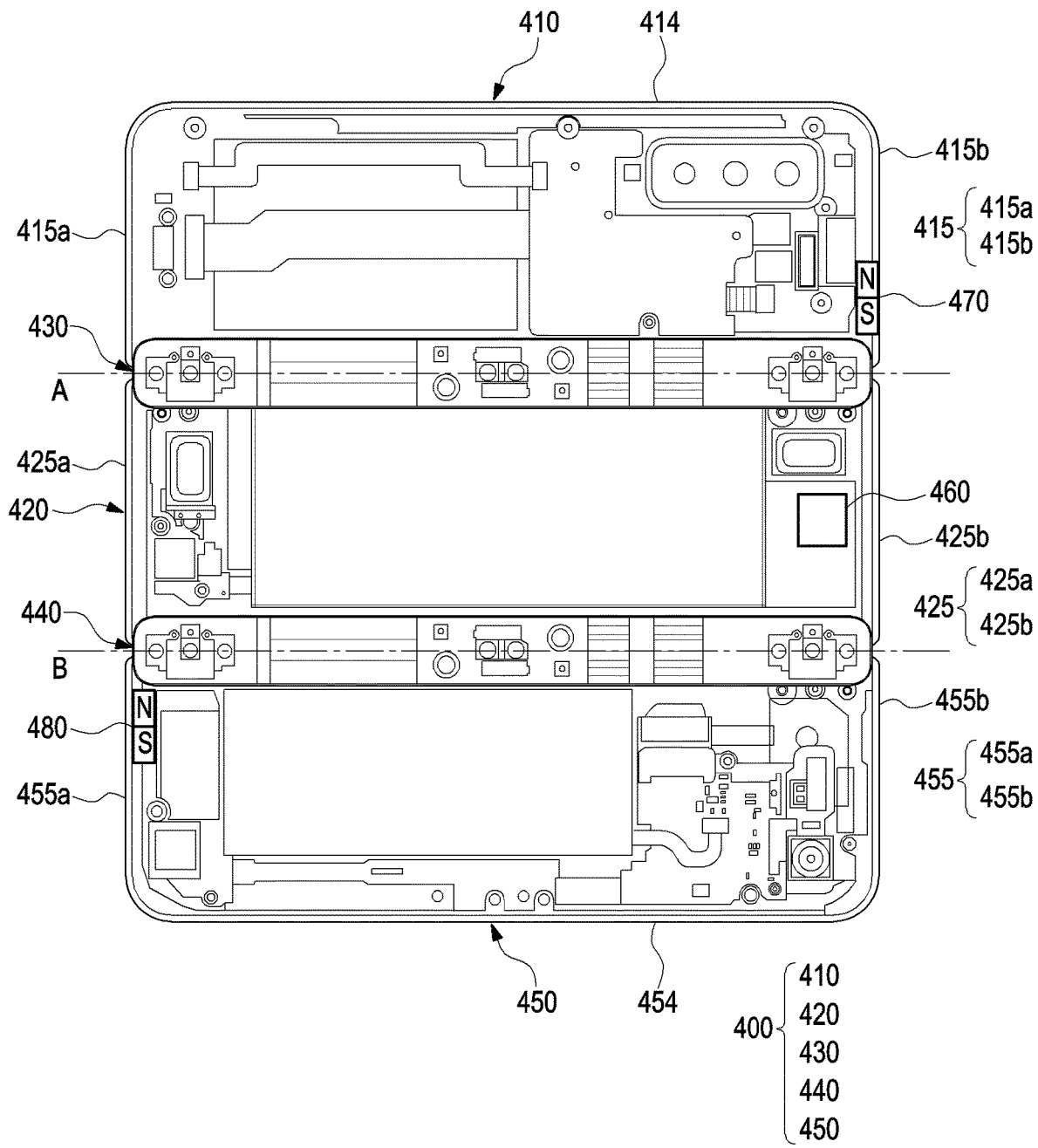
FIG. 11 illustrates a simplified diagram illustrating a double foldable electronic device (or a 3-step foldable electronic device) and arrangement of various components included in the double foldable electronic device according to an embodiment different from an embodiment illustrated in FIGS. 2A to 10.
Figure 12:
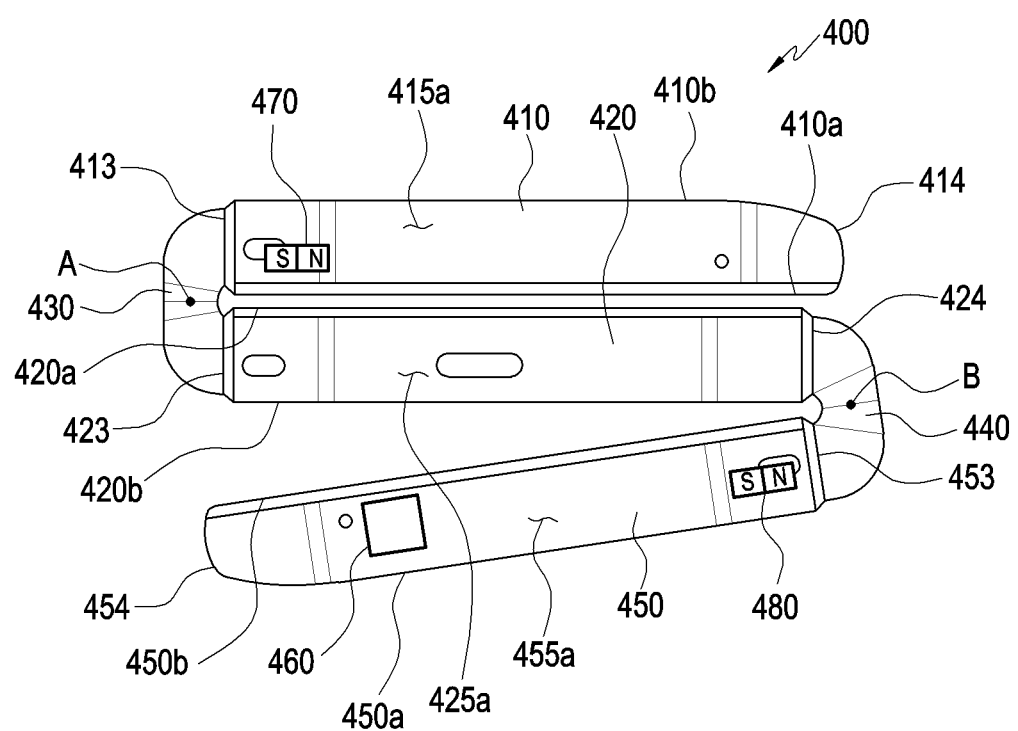
FIG. 12 illustrates a diagram illustrating a process of folding at least a part of a double foldable electronic device according to the embodiment illustrated in FIG. 11.

FIG. 11 illustrates a simplified diagram illustrating the double foldable electronic device 400 (or a 3-step foldable electronic device) and arrangement of various components included in the double foldable electronic device 400 according to an embodiment different from the embodiment illustrated in FIGS. 2A to 10. FIG. 12 illustrates a diagram illustrating a process of folding at least a part of the double foldable electronic device 400 according to the embodiment illustrated in FIG. 11.

According to various embodiments of the disclosure, the aforementioned electronic device 101 of FIG. 1 may correspond to the double foldable electronic device 400 (or the 3-step foldable electronic device). According to an embodiment, the double foldable electronic device 400 may include a first hinge structure 430 and a second hinge structure 440. The double foldable electronic device 400 may include a first housing structure 410 coupled to one side of the first hinge structure 430 and a second housing structure 420 coupled to the other side of the first hinge structure 430. The second housing structure 420 may be coupled to one side of the second hinge structure 440, and a third housing structure 450 may be coupled to the other side of the second hinge structure 440.

The first housing structure 410 of the double foldable electronic device 400 may include a first surface 410a, a second surface 410b, a first side surface 413 coupled to the first hinge structure 430 and parallel to a first rotation axis A of the first hinge structure 430, a second side surface 414 facing the opposite direction to the first side surface 413, and third side surfaces 415 perpendicular to the first rotation axis. The third side surfaces 415 may include a (3-1)th side surface 415a on one side of the first housing structure 410 and a (3-2)th 415b on the other side of the first housing structure 410.

The second housing structure 420 of the double foldable electronic device 400 may include a third surface 420a, a fourth surface 420b, a fourth side surface 423 coupled to the first hinge structure 430 and parallel to the first rotation axis A, a fifth side surface 424 facing the opposite direction to the fourth side surface 423, and sixth side surfaces 425 perpendicular to the first rotation axis A. The sixth side surfaces 425 may include a (6-1)th side surface 425a on one side of the second housing structure 420 and a (6-2)th side surface 425b on the other side of the second housing structure 420. The first housing structure 410 and the second housing structure 420 may be folded with respect to the first hinge structure 430.

The third housing structure 450 of the double foldable electronic device 400 may include a fifth surface 450a, a sixth surface 450b, a seventh side surface 453 coupled to the second hinge structure 440, an eighth side surface 454 facing the opposite direction to the seventh side surface 453, and ninth side surfaces 455 perpendicular to a second rotation axis B. The ninth side surfaces 455 may include a (9-1)th side surface 455a on one side of the third housing structure 350 and a (9-2)th side surface 455b on the other side of the third housing structure 450. According to various embodiments, the second housing structure 420 and the third housing structure 450 may be folded with respect to the second hinge structure 440.

While not shown in the drawings, the double foldable electronic device 400 may include a flexible display (not shown) provided to be seated over the front surface (e.g., the first surface 410a) of the first housing structure 410, the front surface (e.g., the third surface 420a) of the second housing structure 420, and the front surface (e.g., the fifth surface 450a) of the third housing structure 450, and foldable along according to the folded states of the housing structures 410, 420 and 450. According to an embodiment, when the double foldable electronic device 400 is fully unfolded such that the first housing structure 410, the second housing structure 420, and the third housing structure 450 are on substantially the same plane, the double foldable electronic device 400 may provide a widest screen to the user, as illustrated in FIG. 11.

In a foldable housing of the double foldable electronic device 400 illustrated in FIGS. 11 and 12, the first housing structure 410 and the second housing structure 420 may be freely folded around the first hinge structure 430 depending on a user manipulation, the action of other external forces, or the angle between the first housing structure 410 and the second housing structure 420. Separately from or additionally to this operation, in the foldable housing of the double foldable electronic device 400, the second housing structure 420 and the third housing structure 450 may be freely folded according to a user manipulation, the action of other external forces, or the angle between the second housing structure 420 and the third housing structure 450. The folding operation using the first hinge structure 430 and the folding operation using the second hinge structure 440 may be performed independently of each other, and simultaneously or at different times.

The double foldable electronic device 400 illustrated in FIGS. 11 and 12 may include a geomagnetic sensor 460, a first magnetic member 470, and a second magnetic member 480. According to an embodiment, the geomagnetic sensor 460 may be disposed in the second housing structure 420, the first magnetic member 470 may be included in the first housing structure 410, and the second magnetic member 480 may be included in the third housing structure 450. According to other embodiments, the first magnetic member 470 may be disposed in the vicinity of the third side surface 415 of the first housing structure 410, and the second magnetic member 480 may be disposed in the vicinity of the ninth side surface 455 of the third housing structure 450. Various positions may be set for the geomagnetic sensor 460, the first magnetic member 470, and the second magnetic member 480 according to embodiments. The first magnetic member 470 and the second magnetic member 480 may be disposed freely in the first housing structure 410 and the third housing structure 450, respectively. However, since when the magnetic members are disposed too close to the geomagnetic sensor 460, an azimuth error may occur in the geomagnetic sensor 460, the first magnetic member 470 and the second magnetic member 480 may be disposed at positions that do not affect magnetic north determination of the geomagnetic sensor 460. A threshold that affects the magnetic north determination operation from the geomagnetic sensor 245 may be set for each of three axes (X, Y, and Z axes), and the first magnetic member 311 and the second magnetic member 321 may be disposed at distances (separation distances) that do not exceed the threshold.

As a guide for methods of disposing the first magnetic member 470 and the second magnetic member 480, the embodiments described before with reference to FIGS. 7A to 8B may be applied. In the drawing, the first magnetic member 470 and the second magnetic member 480 are shown as disposed on side surfaces of the electronic device 400, for example, the (3-2)th side surface 415*b* and the (9-1)th side surface 455*a*, which should not be construed as limiting the disclosure. In addition, while each of the first magnetic member 470 and the second magnetic member 480 is shown as having a dipole and disposed such that each polarity oriented in parallel to the length direction of a side surface (e.g., the (3-2)th side surface 415*b* and the (9-1)th side surface 455*a*) of the electronic device 400, the disclosure is not limited to the illustration.

According to various embodiments, the first magnetic member 470 and the second magnetic member 480 may be disposed to have different polarities. The electronic device according to various embodiments of the disclosure may be provided to perform a function of determining magnetic north as well as a function of identifying a folded state of the double foldable electronic device, without a separate hall IC by applying the geomagnetic sensor 460 attached for determining magnetic north and a structure in which magnetic members having different polarities are attached in the housing structures.

According to an embodiment, as illustrated in FIG. 12, when the first housing structure 410 is folded in with respect to the second housing structure 420 such that a display disposed on the front surface (e.g., the first surface 410*a*) of the first housing structure 410 and a display disposed on the front surface (e.g., the third surface 420*a*) of the second housing structure 420 face each other, the display parts facing each other may be considered to be, for example, in the sleep mode and thus deactivated. When the third housing structure 450 is folded out with respect to the second housing structure 420 so that the rear surface (e.g., the sixth surface 450*b*) of the third housing structure 450 and the rear surface (e.g., the fourth surface 420*b*) of the second housing structure 420 face each other, a display part disposed on the front surface (e.g., the fifth surface 450*a*) of the third housing structure 450 is exposed to the outside. Therefore, the display part may be considered to be, for example, in the wake-up mode and thus activated.

According to other embodiments, when the first housing structure 410 is folded out with respect to the second housing structure 420, and the third housing structure 450 is folded in with respect to the second housing structure 420, a part of the display may be considered to be, for example, in the wake-up mode and thus activated, while the other part of the display may be considered to be in the sleep mode and thus deactivated.

According to other embodiments, when the first housing structure 410, the second housing structure 420, and the third housing structure 450 are disposed on substantially the same plane and thus the display is fully unfolded, the display may be considered to be in the wake-up mode and activated. Obviously, the disclosure is not necessarily limited to this embodiment. When no input is generated for a predetermined time even in the fully unfolded state of the display, various embodiments may be applied, such as switching from the wake-up mode to the sleep mode.

As described above, according to various embodiments of the disclosure, some of the functions of the double foldable electronic device 400 may be activated (e.g., the wake-up mode) or deactivated (e.g., the sleep mode) depending on a direction in which the first housing structure 410 is folded with respect to the second housing structure 420 or a direction in which the third housing structure 450 is folded with respect to the second housing structure 420. Depending on a direction in which the first housing structure 410 is folded with respect to the second housing structure 420 or the direction in which and a degree to which the third housing structure 450 is folded with respect to the second housing structure 420, the size of the area of the display exposed to the user may be set in various manners. As the area of the display exposed to the user is activated and a non-exposed area of the display is deactivated, power consumption may be reduced, and user convenience may be increased. To this end, according to various embodiments of the disclosure, the geomagnetic sensor 460 and the at least two magnetic members 470 and 480 may be included as a means for determining the relative positional relationship of the housing structures 410, 420, and 450.

An electronic device according to various embodiments of the disclosure, which has an extendable display, may include a foldable electronic device in which at least a part of a display may be folded around a folding area, a slidable electronic device in which at least a part of a display may move linearly, and a rollable electronic device in which at least a part of a display may be rolled.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device (e.g., the electronic device 101 of FIGS. 1 to 3) combinable with a cover (e.g., the cover 300 of FIG. 4) for protecting the electronic device may include: a housing (e.g., the housing 210 of FIGS. 2A and 2B) including a first surface (e.g., the rear surface 210B of FIG. 2B) facing a first direction; and a second surface (e.g., the first surface 210A of FIG. 2A) facing a second direction opposite to the first direction, wherein an inner space is formed between the first surface and the second surface; a board (e.g., the PCB 240 of FIG. 5) disposed in the inner space; a geomagnetic sensor (e.g., the geomagnetic sensor 245 of FIG. 5) disposed on the board; and a processor (e.g., the processor 120 of FIG. 1). The geomagnetic sensor may be configured to detect a first magnetic force, when a first cover part (e.g., the first cover part 310 of FIG. 4) of the cover, including a first magnetic member (e.g., the first magnetic member 311 of FIG. 5), is disposed to cover the first surface from the first direction of the electronic device, and detect a second magnetic force, when a second cover part (e.g., the second cover part 320 of FIG. 4) of the cover, including a second magnetic member (e.g., the second magnetic member 321 of FIG. 5), is disposed to cover the second surface from the second direction of the electronic device in a state where the first cover part is disposed to cover the first surface from the first direction of the electronic device. The processor may be configured to determine whether the cover is coupled with the electronic device, along with determining magnetic north, based on information about a magnetic force detected by the geomagnetic sensor.

According to various embodiments, the cover may be an accessory cover attachable to or detachable from the electronic device.

According to various embodiments, the geomagnetic sensor may be configured to detect a third magnetic force, when the second cover part is disposed to cover the first cover part from the first direction of the electronic device in the state where the first cover part is disposed to cover the first surface from the first direction of the electronic device.

According to various embodiments, the electronic device may further include an antenna for wireless authentication with the cover, and the processor may be configured to perform a wireless authentication operation for determining whether the cover is genuine based on information received from the antenna, when the cover is coupled with the electronic device.

According to various embodiments, the processor may be configured to apply a correction coefficient according to whether the cover is coupled with the electronic device, upon the determination of the magnetic north.

According to various embodiments, the processor may be configured to apply a first correction coefficient in which influence of the first magnetic member, influence of a wireless authentication module, and influence of the second magnetic member are considered, in a state where the first cover part is disposed to cover the first surface from the first direction of the electronic device, and a state in which the second cover part is disposed to cover the second surface from the second direction of the electronic device.

According to various embodiments, the processor may be configured to apply a second correction coefficient in which influence of the first magnetic member, influence of a wireless authentication module, and influence of the second magnetic member are considered, in a state in which the first cover part is disposed to cover the first surface from the first direction of the electronic device, and a state in which the second cover part is disposed to cover the first cover part from the first direction of the electronic device.

According to various embodiments, the processor may be configured to apply a third correction coefficient in which influence of the first magnetic member and influence of a wireless authentication module are considered, in a fully unfolded state in which the first cover part and the second cover part are located on substantially the same plane, and an intermediate state in which the second cover part does not cover either of the second surface of the electronic device or the first cover part.

According to various embodiments of the disclosure, in a method of controlling an electronic device (e.g., the electronic device 101 of FIGS. 1 to 3) including a display (e.g., the display 230 of FIG. 3), an antenna (e.g., the antenna 270 of FIG. 3), a geomagnetic sensor (e.g., the geomagnetic sensor 24 of FIG. 5), and a processor (e.g., the processor 120 of FIG. 1), and combinable with a cover (e.g., the cover 300 of FIG. 4), based on a magnetic force measured by the geomagnetic sensor, when a first magnetic force greater than a predetermined value is detected from a first direction, determining, by the processor, that a first cover part of the cover is coupled with the electronic device and performing a wireless authentication operation, and when a second magnetic force greater than a predetermined value is detected from a second direction after the cover is identified as genuine according to the wireless authentication operation, determining, by the processor, that a second cover part of the cover covers at least a part of the display of the electronic device and performing an operation of deactivating the at least part of the display.

According to various embodiments, when a third magnetic force greater than a predetermined value is detected from the first direction after the cover is identified as genuine according to the wireless authentication operation, determining, by the processor, that the display is opened and performing an operation of activating the display.

According to various embodiments, performing, by the processor, a function of determining magnetic north, along with determining whether the first cover part is coupled with the electronic device, and whether the second cover part covers the at least part of the display of the electronic device.

According to various embodiments, applying, by the processor, a correction coefficient according to whether the cover is coupled with the electronic device upon the determination of the magnetic north.

According to various embodiments, in a state where the first cover part of the cover, including a first magnetic member, is disposed to cover a first surface of the electronic device from the first direction of the electronic device, and a state in which the second cover part of the cover, including a second magnetic member, is disposed to cover a second surface of the electronic device from the second direction of the electronic device, applying, by the processor, a first correction coefficient in which influence of the first magnetic member, influence of a wireless authentication module, and influence of the second magnetic member are considered.

According to various embodiments, in a state where the first cover part of the cover, including a first magnetic member, is disposed to cover a first surface of the electronic device from the first direction of the electronic device, and a state in which the second cover part of the cover, including a second magnetic member, is disposed to cover the first cover part from the first direction of the electronic device, applying, by the processor, a second correction coefficient in which influence of the first magnetic member, influence of a wireless authentication module, and influence of the second magnetic member are considered.

According to various embodiments, in a fully unfolded state in which the first cover part of the cover, including a first magnetic member and the second cover part of the cover, including a second magnetic member are located on substantially the same plane, and an intermediate state in which the second cover part of the cover does not cover either of a second surface of the electronic device or the first cover part, applying, by the processor, a third correction coefficient in which influence of the first magnetic member and influence of a wireless authentication module are considered.

According to various embodiments of the disclosure, an electronic device may include: a housing including a first surface facing a first direction; and a second surface facing a second direction opposite to the first direction, wherein an inner space is formed between the first surface and the second surface; a board disposed in the inner space; a geomagnetic sensor disposed on the board; and a cover configured to protect the electronic device, and including a first cover part for covering the first surface of the electronic device and a second cover part for covering the second surface of the electronic device; a first magnetic member disposed at a first position of the first cover part; and a second magnetic member disposed at a second position of the second cover part. The first position of the first magnetic member may be set to a position at which a first magnetic force acts on the geomagnetic sensor, when the first cover part is disposed to cover the first surface from the first direction of the electronic device, and the second position of the second magnetic material may be set to a position at which a second magnetic force acts on the geomagnetic sensor, when the second cover part is disposed to cover the second surface from the second direction of the electronic device in a state in which the first cover part is disposed to cover the first surface from the first direction of the electronic device.

According to various embodiments, the first magnetic member may be disposed within the first cover part to make a first pole face the first surface, and the second magnetic member may be disposed within the second cover part to make a second pole different from the first pole face the second surface.

According to various embodiments, the second position of the second magnetic member may be set to a position at which a third magnetic force acts on the geomagnetic sensor, when the second cover part is disposed to cover the first cover part from the first direction of the electronic device in a state in which the first cover part is disposed to cover the first surface from the first direction of the electronic device.

According to various embodiments, the electronic device may further include a processor, and the processor may be configured to determine whether the cover is coupled with the electronic device, along with determining magnetic north based on information about a magnetic force detected by the geomagnetic sensor, and apply a correction coefficient according to whether the cover is attached to or detached from the electronic device, upon the determination of the magnetic north.

According to various embodiments, the electronic device may further include a processor and an antenna for wireless authentication with the cover, and the processor may be configured to perform a wireless authentication operation for determining whether the cover is genuine based on information received from the antenna, when the cover is attached to the electronic device.

According to various embodiments of the disclosure, an electronic device (e.g., the electronic device 101 of FIGS. 1 to 3 or the electronic device 400 of FIGS. 11 and 12) may include: a housing; a board disposed in an inner space of the housing; a geomagnetic sensor (e.g., the geomagnetic sensor 245 of FIG. 5 or the geomagnetic sensor 460 of FIGS. 11 and 12) disposed on the board; and a processor. The geomagnetic sensor may be configured to detect a first magnetic force from a first direction or a second magnetic force from a second direction from each of a first magnetic member (e.g., the first magnetic member 311 of FIG. 5 or the first magnetic member 470 of FIGS. 11 and 12) and a second magnetic member (e.g., the second magnetic member of FIG. 5 or the second magnetic member 480 of FIGS. 11 and 12) which are disposed inside the housing or in a cover covering at least a part of the housing, spaced apart from the geomagnetic sensor by a specified distance and have variable positions. The processor may be configured to be capable of determining whether the cover is coupled with the electronic device or various motions of the electronic device, along with determining magnetic north, based on information about the magnetic force detected by the geomagnetic sensor.

According to various embodiments, the first magnetic member may be disposed in a first cover part (e.g., the first cover part 310 of FIG. 4) of the cover (e.g., the cover 300 of FIG. 4), and the second magnetic member is disposed in a second cover part (e.g., the second cover part 320 of FIG. 4) of the cover.

According to various embodiments, the housing may include: a first hinge structure (e.g., the first hinge structure 430 of FIGS. 11 and 12); a second hinge structure (e.g., the second hinge structure 440 of FIGS. 11 and 12); a first housing structure (e.g., the first housing structure 410 of FIGS. 11 and 12) coupled to one side of the first hinge structure; a second housing structure (e.g., the second housing structure 420 of FIGS. 11 and 12) coupled with the other side of the first hinge structure and disposed between the first hinge structure and one side of the second hinge structure; and a third housing structure (e.g., the third housing structure 450 of FIGS. 11 and 12) coupled to the other side of the second hinge structure. The geomagnetic sensor (e.g., the geomagnetic sensor 460 of FIGS. 11 and 12) may be disposed in the second housing structure, the first magnetic member (e.g., the first magnetic member 470 of FIGS. 11 and 12) may be disposed in the first housing structure, and the second magnetic member (e.g., the second magnetic member 480 of FIGS. 11 and 12) may be disposed in the third housing structure.

While specific embodiments have been described above in the detailed description of the disclosure, it will be apparent to those skilled in the art that many modifications can be made without departing from the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device combinable with a cover for protecting the electronic device, comprising:
    a housing including a first surface facing a first direction; and a second surface facing a second direction opposite to the first direction, wherein an inner space is formed between the first surface and the second surface;
    a board disposed in the inner space;
    a geomagnetic sensor disposed on the board; and
    a processor,
    wherein the geomagnetic sensor is configured to detect a first magnetic force, when a first cover part of the cover, including a first magnetic member, is disposed to cover the first surface from the first direction of the electronic device, and detect a second magnetic force, when a second cover part of the cover, including a second magnetic member, is disposed to cover the second surface from the second direction of the electronic device in a state where the first cover part is disposed to cover the first surface from the first direction of the electronic device, and
    wherein the processor is configured to determine whether the cover is coupled with the electronic device, along with determining magnetic north, based on information about a magnetic force detected by the geomagnetic sensor.

2. The electronic device of claim 1, wherein the cover is an accessory cover attachable to or detachable from the electronic device.

3. The electronic device of claim 1, wherein the geomagnetic sensor is configured to detect a third magnetic force, when the second cover part is disposed to cover the first cover part from the first direction of the electronic device in the state where the first cover part is disposed to cover the first surface from the first direction of the electronic device.

4. The electronic device of claim 1, further comprising an antenna for wireless authentication with the cover,
    wherein the processor is configured to perform a wireless authentication operation for determining whether the cover is genuine based on information received from the antenna, when the cover is coupled with the electronic device.

5. The electronic device of claim 1, wherein the processor is configured to apply a correction coefficient according to whether the cover is coupled with the electronic device, upon the determination of the magnetic north.

6. The electronic device of claim 5, wherein the processor is configured to apply a first correction coefficient in which influence of the first magnetic member, influence of a wireless authentication module, and influence of the second magnetic member are considered, in a state where the first cover part is disposed to cover the first surface from the first direction of the electronic device, and a state in which the second cover part is disposed to cover the second surface from the second direction of the electronic device.

7. The electronic device of claim 5, wherein the processor is configured to apply a second correction coefficient in which influence of the first magnetic member, influence of a wireless authentication module, and influence of the second magnetic member are considered, in a state in which the first cover part is disposed to cover the first surface from the first direction of the electronic device, and a state in which the second cover part is disposed to cover the first cover part from the first direction of the electronic device.

8. The electronic device of claim 5, wherein the processor is configured to apply a third correction coefficient in which influence of the first magnetic member and influence of a wireless authentication module are considered, in a fully unfolded state in which the first cover part and the second cover part are located on substantially the same plane, and an intermediate state in which the second cover part does not cover either of the second surface of the electronic device or the first cover part.

9. An electronic device comprising:
    a housing including a first surface facing a first direction; and a second surface facing a second direction opposite to the first direction, wherein an inner space is formed between the first surface and the second surface;
    a board disposed in the inner space;
    a geomagnetic sensor disposed on the board; and
    a cover configured to protect the electronic device, and including a first cover part for covering the first surface of the electronic device and a second cover part for covering the second surface of the electronic device;

a first magnetic member disposed at a first position of the first cover part; and a second magnetic member disposed at a second position of the second cover part, wherein the first position of the first magnetic member is set to a position at which a first magnetic force acts on the geomagnetic sensor, when the first cover part is disposed to cover the first surface from the first direction of the electronic device, and the second position of the second magnetic member is set to a position at which a second magnetic force acts on the geomagnetic sensor, when the second cover part is disposed to cover the second surface from the second direction of the electronic device in a state in which the first cover part is disposed to cover the first surface from the first direction of the electronic device.

10. The electronic device of claim 9, wherein the first magnetic member is disposed within the first cover part to make a first pole face the first surface, and wherein the second magnetic member is disposed within the second cover part to make a second pole different from the first pole face the second surface.

11. The electronic device of claim 9, wherein the second position of the second magnetic member is set to a position at which a third magnetic force acts on the geomagnetic sensor, when the second cover part is disposed to cover the first cover part from the first direction of the electronic device in a state in which the first cover part is disposed to cover the first surface from the first direction of the electronic device.

12. The electronic device of claim 9, further comprising a processor, wherein the processor is configured to:

determine whether the cover is coupled with the electronic device, along with determining magnetic north based on information about a magnetic force detected by the geomagnetic sensor, and apply a correction coefficient according to whether the cover is attached to or detached from the electronic device, upon the determination of the magnetic north.

13. The electronic device of claim 9, further comprising a processor and an antenna for wireless authentication with the cover, wherein the processor is configured to perform a wireless authentication operation for determining whether the cover is genuine based on information received from the antenna, when the cover is attached to the electronic device.

14. An electronic device comprising:

a housing;

a board disposed in an inner space of the housing;

a geomagnetic sensor disposed on the board; and a processor, wherein the geomagnetic sensor is configured to detect a first magnetic force from a first direction or a second magnetic force from a second direction from each of a first magnetic member and a second magnetic member which are disposed inside the housing or in a cover covering at least a part of the housing, spaced apart from the geomagnetic sensor by a specified distance and have variable positions, and wherein the processor is configured to be capable of determining whether the cover is coupled with the electronic device or various motions of the electronic device, along with determining magnetic north, based on information about the magnetic force detected by the geomagnetic sensor.

15. The electronic device of claim 14, wherein the first magnetic member is disposed in a first cover part of the cover, and the second magnetic member is disposed in a second cover part of the cover.

16. The electronic device of claim 15, wherein the housing comprises:

a first hinge structure;

a second hinge structure;

a first housing structure coupled to one side of the first hinge structure;

a second housing structure coupled to another side of the first hinge structure and disposed between the first hinge structure and one side of the second hinge structure; and a third housing structure coupled to another side of the second hinge structure, and wherein the geomagnetic sensor is disposed in the second housing structure, the first magnetic member is disposed in the first housing structure, and the second magnetic member is disposed in the third housing structure.

* * * * *